US012315340B2

(12) United States Patent
McPhail et al.

(10) Patent No.: US 12,315,340 B2
(45) Date of Patent: May 27, 2025

(54) INTEGRATED JACKPOT GAMING SYSTEMS AND METHODS

(71) Applicant: Aristocrat Technologies, Inc., Las Vegas, NV (US)

(72) Inventors: Gavin McPhail, Las Vegas, NV (US); Rajneesh Sharma, Las Vegas, NV (US); Mohit Churiyal, Henderson, NV (US); Joshua Adams, Las Vegas, NV (US); Michael Smith, Las Vegas, NV (US); Samarth Raman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 100 days.

(21) Appl. No.: 17/491,291

(22) Filed: Sep. 30, 2021

(65) Prior Publication Data

US 2022/0148384 A1 May 12, 2022

Related U.S. Application Data

(60) Provisional application No. 63/242,994, filed on Sep. 10, 2021, provisional application No. 63/112,400, filed on Nov. 11, 2020.

(51) Int. Cl.
*G07F 17/32* (2006.01)
*G06F 7/58* (2006.01)
*G07F 17/34* (2006.01)

(52) U.S. Cl.
CPC .......... *G07F 17/3258* (2013.01); *G06F 7/588* (2013.01); *G07F 17/3237* (2013.01);

(Continued)

(58) Field of Classification Search
CPC .......................... G07F 17/3258; G07F 17/3272
See application file for complete search history.

(56) References Cited

U.S. PATENT DOCUMENTS

| 5,830,067 | A | 11/1998 | Graves |
| 5,967,895 | A | 10/1999 | Kellen |

(Continued)

OTHER PUBLICATIONS

Office Action (Non-Final Rejection) dated Jun. 24, 2022 for U.S. Appl. No. 17/491,200 (pp. 1-11).

(Continued)

*Primary Examiner* — Robert E Mosser
(74) *Attorney, Agent, or Firm* — Armstrong Teasdale LLP

(57) ABSTRACT

A bonusing system for gaming devices provides a first bonus award eligible to be won via participating gaming devices. The bonusing system is configured to: establish the first bonus award as available to participating gaming devices based on a bonus award configuration; register a plurality of electronic gaming machines (EGMs) and a plurality of table gaming devices to participate in the first bonus award; receive, from a first electronic gaming machine (EGM), a first wager event message indicating a first wager being performed by a first player at the first EGM; receive, from a first table gaming device, a second wager event message indicating a second wager being performed by a second player at the first table gaming device; determine that one of the first and second wager events results in an award of the bonus award based on output of a random number generator (RNG), the award of the bonus award identifying one or more of a winning player and a winning gaming device; and award the bonus award to the winning player at the winning gaming device based on the determination.

20 Claims, 14 Drawing Sheets

(52) U.S. Cl.
CPC ...... *G07F 17/3262* (2013.01); *G07F 17/3272* (2013.01); *G07F 17/34* (2013.01)

(56) References Cited

U.S. PATENT DOCUMENTS

| | | |
|---|---|---|
| 6,183,362 B1 | 2/2001 | Boushy |
| 6,306,038 B1 | 10/2001 | Graves |
| 6,311,976 B1 | 11/2001 | Yoseloff |
| 6,988,946 B2 | 1/2006 | Michaelson |
| 7,066,815 B2 | 6/2006 | Walker |
| 7,128,652 B1 | 10/2006 | Lavoie |
| 7,524,244 B2 | 4/2009 | Walker |
| 7,588,495 B2 | 9/2009 | Walker |
| 7,727,071 B2 | 6/2010 | Giobbi |
| 7,785,183 B1 | 8/2010 | Stockham |
| 7,806,761 B2 | 10/2010 | Walker |
| 7,815,502 B2 | 10/2010 | Hardy |
| 8,475,257 B2 | 7/2013 | Bienvenue |
| 9,305,427 B2 | 4/2016 | Walker |
| 9,558,619 B2 | 1/2017 | Froy |
| 9,659,435 B2 | 5/2017 | Rogers |
| 9,659,459 B2 | 5/2017 | Phillips |
| 9,922,493 B2 | 3/2018 | Walker |
| 10,269,209 B2 | 4/2019 | Miltenberger |
| 10,726,670 B2 | 7/2020 | Price |
| 11,508,217 B2 | 11/2022 | Harris |
| 2001/0007815 A1 | 7/2001 | Philipsson |
| 2002/0094860 A1 | 7/2002 | Itkis |
| 2004/0053694 A1 | 3/2004 | Rowe |
| 2004/0082384 A1 | 4/2004 | Walker |
| 2004/0148251 A1 | 7/2004 | Kavoun |
| 2004/0248645 A1 | 12/2004 | Blackburn |
| 2005/0059467 A1 | 3/2005 | Saffari |
| 2005/0187014 A1 | 8/2005 | Saffari |
| 2005/0193209 A1 | 9/2005 | Saunders |
| 2005/0250569 A1 | 11/2005 | Kane |
| 2006/0154727 A1 | 7/2006 | Okuniewicz |
| 2006/0205477 A1 | 9/2006 | Fisk |
| 2006/0205481 A1 | 9/2006 | Dominelli |
| 2006/0247035 A1* | 11/2006 | Rowe ................ G07F 17/3258 463/26 |
| 2007/0060237 A1* | 3/2007 | Rowe .................. G07F 17/32 463/40 |
| 2007/0202941 A1 | 8/2007 | Miltenberger |
| 2007/0259709 A1 | 11/2007 | Kelly |
| 2007/0298873 A1* | 12/2007 | Nguyen ............... G07F 17/32 463/27 |
| 2008/0150678 A1 | 6/2008 | Giobbi |
| 2009/0111560 A1 | 4/2009 | Davis |
| 2009/0143128 A1 | 6/2009 | Cautley |
| 2009/0275399 A1 | 11/2009 | Kelly |
| 2009/0276341 A1 | 11/2009 | McMahan |
| 2010/0229108 A1 | 9/2010 | Gerson |
| 2011/0245943 A1 | 10/2011 | Agarwal |
| 2011/0287823 A1 | 11/2011 | Guinn |
| 2012/0225726 A1 | 9/2012 | Anderson |
| 2013/0130766 A1 | 5/2013 | Harris |
| 2014/0221071 A1 | 8/2014 | Calio |
| 2014/0256407 A1 | 9/2014 | Graf |
| 2014/0274277 A1 | 9/2014 | Cuddy |
| 2014/0357354 A1* | 12/2014 | Gura ................. G07F 17/3223 463/29 |
| 2015/0194020 A1 | 7/2015 | Lamendola |
| 2015/0235507 A1 | 8/2015 | Newton |
| 2015/0302482 A1 | 10/2015 | Vagner |
| 2016/0335855 A1 | 11/2016 | Ishibashi |
| 2017/0270493 A1 | 9/2017 | Lugli |
| 2019/0220853 A1 | 7/2019 | Srinivasan |
| 2020/0043045 A1 | 2/2020 | Jurich, Jr. |
| 2020/0051377 A1 | 2/2020 | Montenegro |
| 2020/0099694 A1 | 3/2020 | Weiss |
| 2020/0226885 A1 | 7/2020 | Weaver |
| 2020/0402353 A1 | 12/2020 | Higgins |
| 2021/0134104 A1 | 5/2021 | Harris |
| 2021/0233351 A1 | 7/2021 | Meltzer |
| 2021/0327189 A1 | 10/2021 | Jarvis |
| 2022/0032168 A1 | 2/2022 | Gupta |
| 2022/0036692 A1 | 2/2022 | Gupta |
| 2022/0270434 A1 | 8/2022 | Welch |
| 2023/0137728 A1 | 5/2023 | Anbazhagan |
| 2024/0112179 A1 | 4/2024 | Mneyard, IV |
| 2024/0249588 A1 | 7/2024 | Shepherd |

OTHER PUBLICATIONS

Office Action (Non-Final Rejection) dated Dec. 8, 2022 for U.S. Appl. No. 17/443,738 (pp. 1-19).
Office Action (Non-Final Rejection) dated Dec. 12, 2022 for U.S. Appl. No. 17/443,745 (pp. 1-9).
Office Action (Notice of Allowance and Fees Due (PTOL-85)) dated Dec. 27, 2022 for U.S. Appl. No. 17/491,200 (pp. 1-13).
Office Action (Notice of Allowance and Fees Due (PTOL-85)) dated Jan. 19, 2023 for U.S. Appl. No. 17/491,200 (pp. 1-2).
Office Action (Non-Final Rejection) dated Mar. 15, 2023 for U.S. Appl. No. 17/491,523 (pp. 1-29).
Office Action (Final Rejection) dated Mar. 24, 2023 for U.S. Appl. No. 17/443,745 (pp. 1-11).
Office Action (Notice of Allowance and Fees Due (PTOL-85) dated Apr. 13, 2023 for U.S. Appl. No. 17/491,200 (pp. 1-7).
Office Action (Final Rejection) dated Apr. 20, 2023 for U.S. Appl. No. 17/443,738 (pp. 1-13).
Notice of Allowance dated Apr. 13, 2023 for U.S. Appl. No. 17/491,200 (pp. 1-7).
Office Action (Non-Final Rejection) dated Jun. 14, 2023 for U.S. Appl. No. 17/491,528 (pp. 1-9).
Office Action (Notice of Allowance and Fees Due (PTOL-85)) dated Jun. 23, 2023 for U.S. Appl. No. 17/809,844 (pp. 1-9).
Office Action (Non-Final Rejection) dated Jul. 28, 2023 for U.S. Appl. No. 17/443,745 (pp. 1-7).
Office Action (Non-Final Rejection) dated Sep. 7, 2023 for U.S. Appl. No. 17/443,738 (pp. 1-14).
Office Action (Final Rejection) dated Sep. 22, 2023 for U.S. Appl. No. 17/491,523 (pp. 1-37).
Office Action (Notice of Allowance and Fees Due (PTOL-85)) dated Oct. 13, 2023 for U.S. Appl. No. 17/491,528 (pp. 1-8).
Office Action (Notice of Allowance and Fees Due (PTOL-85)) dated Oct. 24, 2023 for U.S. Appl. No. 17/443,745 (pp. 1-7).
Office Action (Notice of Allowance and Fees Due (PTOL-85)) dated Dec. 19, 2023 for U.S. Appl. No. 17/491,528 (pp. 1-8).
Office Action (Final Rejection) dated Feb. 14, 2024 for U.S. Appl. No. 17/443,738 (pp. 1-14).
Office Action (Non-Final Rejection) dated Jul. 3, 2024 for U.S. Appl. No. 17/443,738 (pp. 1-15).
Office Action (Non-Final Rejection) dated Aug. 12, 2024 for U.S. Appl. No. 18/468,405 (pp. 1-8).
Office Action (Non-Final Rejection) dated Sep. 29, 2024 for U.S. Appl. No. 17/958,117 (pp. 1-8).
Office Action (Non-Final Rejection) dated Oct. 7, 2024 for U.S. Appl. No. 17/958,109 (pp. 1-21).

* cited by examiner

INTEGRATED JACKPOT GAMING SYSTEMS AND METHODS

CROSS-REFERENCE TO RELATED APPLICATIONS

This application claims the benefit of priority to U.S. Provisional Patent Application No. 63/242,994, filed 10 Sep. 2021, entitled "INTEGRATED JACKPOT GAMING SYSTEMS AND METHODS," and to U.S. Provisional Patent Application No. 63/112,400, filed Nov. 11, 2020, entitled "RANDOM BASED GAME OUTCOMES FOR REMOTE GAME PLAY," the entire contents and disclosures of which are hereby incorporated herein by reference in their entirety.

TECHNICAL FIELD

The disclosure relates generally to the field of electronic gaming devices, gaming systems, and jackpot systems within a regulated gaming environment. More particularly, but not by way of limitation, this disclosure relates to jackpot gaming systems providing jackpots across various gaming platforms and venues.

BACKGROUND

Electronic gaming machines (EGMs) or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of a game instance (or single play) of a primary or base game. In some cases, a player may qualify for a special mode of the base game, a secondary game feature, or a bonus game feature of the base game by attaining a certain winning combination or triggering event in, or related to, the base game, or after the player is randomly awarded the special mode, secondary game feature, or bonus game feature. In the special mode, secondary game feature, or bonus game feature, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

Typical games use a random number generator (RNG) to randomly determine the outcomes for the games (also referenced throughout the disclosure as a "random based game outcome"). Examples of random based game outcomes include slots, video poker, video blackjack, video pachinko, keno, bingo, and lottery outcomes. The games are also designed to return a certain percentage of the amount wagered back to the player over the course of many rounds of play or game instances, which is generally referred to as return to player (RTP) for a game. The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Some known EGMs provide jackpots (e.g., "progressives"). With progressive jackpots, the EGM typically contributes a particular amount for each game round (e.g., a predetermined amount per wager, a percentage of each wager). These small amounts are added to the progressive, accumulating over time as a jackpot available to be won by the player. The current value of the progressive is typically displayed on a progressive jackpot meter at or near the EGM to inform nearby players of the current size of the jackpot. The EGMs typically have a pre-defined win condition that will trigger the player to win the progressive jackpot (e.g., 5 special symbols on a slot machine, royal flush on a poker machine, or such). When the player triggers a win for the progressive jackpot, the player is paid the current total and the progressive is typically reset to a base amount, allowing the progressive to begin increasing again.

Some progressives are local to a single EGM (referred to herein as "stand-alone progressives"). Other progressives may be pooled between multiple EGMs (referred to herein as "linked progressives"). With such linked progressives, the participating EGMs similarly collect small amounts per play. Those small amounts are added to a linked progressive jackpot, and that linked progressive jackpot is available to be won on any of the participating EGMs. Typically, a central progressive system server is provided as a central accounting device which tracks contributions from each of the participating EGMs, providing jackpot total amounts to each of the EGMs (e.g., for display locally on their own progressive jackpot meters), auditing win events, and conducting progressive resets upon a confirmed win event. Since multiple EGMs are contributing to the same linked progressive, these progressives typically rise faster and may be won more frequently. However, such linked progressives are traditionally supported by special hardware installed within each EGM (e.g., a progressive controller), as well as a central server system that communicates with each of the progressive controllers (e.g., the progressive system server). Such additional hardware provides additional cost to an EGM device and typically requires regular regulatory auditing to ensure compliance with local laws and may present security vulnerabilities or reliability exposures to operators.

SUMMARY

In one aspect, a bonusing system for gaming devices is provided. The bonusing system includes a memory storing bonus configuration information defining a bonus award eligible to be won via participating gaming devices. The bonusing system also includes a messaging application programming interface (API) configured to receive wagering event messages in a first message format from third-party servers. The bonusing system further includes a message queue configured to receive wagering event messages from the messaging API in a second message format. The bonusing system also includes a bonusing system server configured to manage award determination for the bonus award. The bonusing system further includes at least one processor storing instructions that, when executed, cause the at least one processor to: (i) receive, by the messaging API from a third-party server that manages wagering gaming sessions at a plurality of gaming tables, a first wagering event message indicating a wager event performed by a player at a first gaming table; (ii) convert, by the messaging API, the first wagering event message from the first message format to the second message format; (iii) transmit the first wagering event message for delivery to the bonusing system server; (iv) determine, by the bonusing system server, that the wagering event results in an award of the bonus award based on an output of a random number generator (RNG); and (v) award the bonus award based on the determination.

In another aspect, a method of providing bonusing for a plurality of table gaming devices supported by a third-party server is provided. The method includes creating and managing a jackpot award and award determination for determining a winner of the jackpot award amongst active gaming sessions at a pool of eligible devices that includes the plurality of table gaming devices. The method also includes receiving, from the third-party server, a first wagering event message indicating a wager event performed at a first table gaming device. The method further includes converting, by a messaging API, the first wagering event message from the first message format to the second message format. The method also includes transmitting the first wagering event message for delivery to the bonusing system server. The method further includes determining that the wagering event is awarded the jackpot award based on an output of a random number generator (RNG). The method also includes awarding the bonus award based on the determination.

In yet another aspect, a non-transitory computer-readable medium storing instructions is provided. When executed by at least one processor, the instructions cause the at least one processor to: (i) provide a jackpot award and award determination services for determining a winner of the jackpot award amongst active gaming sessions at a pool of eligible devices that includes a plurality of table gaming devices managed by a third-party server; (ii) receive, from the third-party server, a first wagering event message indicating a wager event performed at a first table gaming device; (iii) convert, by a messaging API, the first wagering event message from the first message format to the second message format; (iv) upon processing of the first wagering event message in the second message format, determine that the wagering event is awarded the jackpot award based on an output of a random number generator (RNG); and (v) award the bonus award based on the determination.

In still another aspect, a bonusing system for gaming devices is provided. The bonusing system includes a memory storing bonus configuration information defining a first bonus award eligible to be won via participating gaming devices. The bonusing system also includes at least one processor storing instructions that, when executed, cause the at least one processor to: (i) establish the first bonus award as available to participating gaming devices based on a bonus award configuration; (ii) register a plurality of electronic gaming machines (EGMs) and a plurality of table gaming devices to participate in the first bonus award; (iii) receive, from a first electronic gaming machine (EGM), a first wager event message indicating a first wager being performed by a first player at the first EGM; (iv) receive, from a first table gaming device, a second wager event message indicating a second wager being performed by a second player at the first table gaming device; (v) determine that one of the first and second wager events results in an award of the bonus award based on output of a random number generator (RNG), the award of the bonus award identifying one or more of a winning player and a winning gaming device; and (vi) award the bonus award to the winning player at the winning gaming device based on the determination.

In yet another aspect, a method of providing bonusing for gaming devices is provided. The method includes establishing a first bonus award as available to participating gaming devices based on a bonus award configuration. The method also includes registering a plurality of electronic gaming machines (EGMs) and a plurality of table gaming devices to participate in the first bonus award. The method further includes receiving, from a first electronic gaming machine (EGM), a first wager event message indicating a first wager being performed by a first player at the first EGM. The method also includes receiving, from a first table gaming device, a second wager event message indicating a second wager being performed by a second player at the first table gaming device. The method further includes establishing eligibility of the first EGM and the first table gaming device to participate in the first bonus award based on detection of an active gaming session at the associated devices. The method also includes determining that one of the first and second wager events results in an award of the bonus award based on output of a random number generator (RNG), the award of the bonus award identifying one or more of a winning player and a winning gaming device. The method further includes awarding the bonus award to the winning player at the winning gaming device based on the determination.

In still another aspect, a non-transitory computer-readable medium storing instructions is provided. When executed by at least one processor, the instructions cause the at least one processor to: (i) establish a first bonus award as available to participating gaming devices based on a bonus award configuration; (ii) register a plurality of electronic gaming machines (EGMs) and a plurality of table gaming devices to participate in the first bonus award; (iii) receive, from a first electronic gaming machine (EGM), a first wager event message indicating a first wager being performed by a first player at the first EGM; (iv) receive, from a first table gaming device, a second wager event message indicating a second wager being performed by a second player at the first table gaming device; (v) configure the first EGM and the first table gaming device as eligible to participate in the first bonus award based on detection of an active gaming session at the associated devices; (vi) determine that one of the first and second wager events results in an award of the bonus award based on output of a random number generator (RNG), the award of the bonus award identifying one or more of a winning player and a winning gaming device; and (vii) award the bonus award to the winning player at the winning gaming device based on the determination.

BRIEF DESCRIPTION OF THE DRAWINGS

An example embodiment of the subject matter disclosed will now be described with reference to the accompanying drawings.

DETAILED DESCRIPTION

Figure 1:
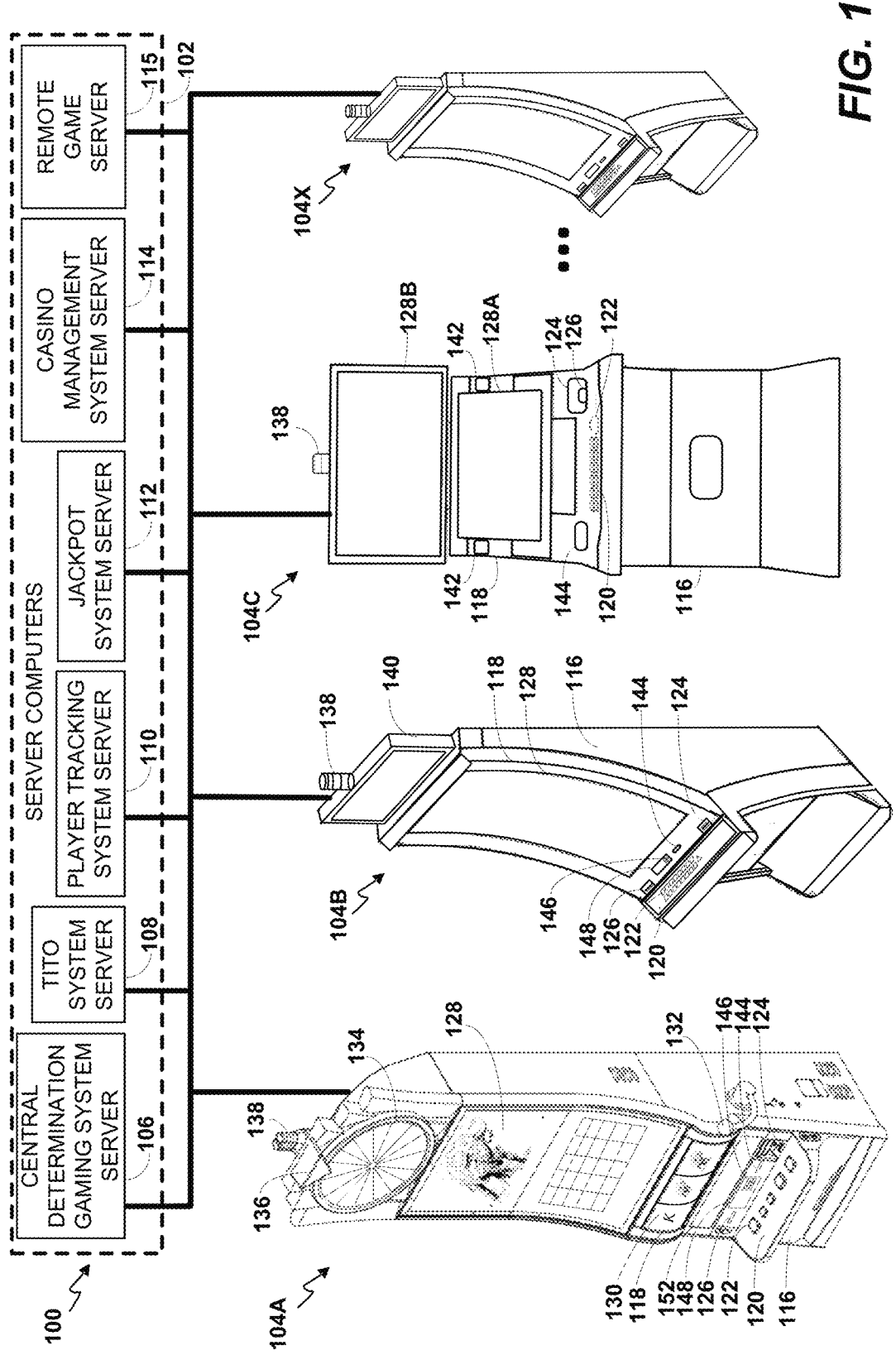
FIG. 1 is an exemplary diagram showing several EGMs networked with various gaming related servers.

One technical problem with conventional jackpot systems involves how to offer a casino floor wide bonus that supports different gaming system types. In conventional jackpot systems, casino bonusing is typically limited to a certain gaming system type. For example, some bonusing platforms may only offer bonus awards to slot floor customers (e.g., those customers actively playing slot machines in person at a gaming property). Such conventional systems typically exclude other wagering activities and devices, such as table-based gaming, mobile device gaming, or the like. Further, some conventional jackpot systems may limit jackpots to particular game types (e.g., particular titles, class-2 or class-3 games, or particular vendors' platforms). As other gaming systems such as table games see technological advances that allow real-time tracking of gaming and wagering activity, a bonusing platform could potentially offer similar bonuses that are currently restricted to particular subsets of gaming devices. However, the communication protocols and software used across the gaming system typically differ. As such, there are technical difficulties to overcome when considering integration of jackpots across disparate device types, game types, vendor platforms, or the like.

The present disclosure provides a jackpot system that is configured to integrate various types of wager games and gaming devices to provide jackpots that can be shared and won by any of the players within the group of disparate, participating devices. As an example, the jackpot system can be setup to provide a bonus feature (e.g., a jackpot, a progressive jackpot) for only slot players (e.g., across disparate vendors, makes, or models of EGMS), another bonus feature for only table players (e.g., across disparate types of table games), or some combination thereof. This type of hybrid bonusing may be referred to herein as "floor wide bonusing," as it provides methods for implementing a bonus across different types of devices that may appear on a casino floor (e.g., at a casino property). Further, the system may provide floor wide bonusing that is not necessarily limited to a particular property, locality, or operator, but instead may, in some embodiments, be centrally implemented to provide bonusing across various geographies.

Another technical problem exists where a bonusing program manager would like to trigger a jackpot award sequence for active players on the floor so that players that qualify are rewarded immediately. Conventional bonusing systems typically are not equipped to allow such control of jackpot awards, but rather are typically restricted to RNG outcomes generated during game play, with pre-configured win changes that are left purely to chance as to when the jackpots are awarded. In some embodiments of the present disclosure, the jackpot system is configured to allow operators to configure when certain jackpot awards are triggered. For example, the jackpot system may allow the bonusing program manager to: (1) randomly select a set number of winners (e.g., 4 winners) currently active on the casino floor with a predefined (e.g., $50) or variable free play prize; (2) randomly award a set number of winners (e.g., 4 winners) an hour for 6 hours at a predefined (e.g., $50) or variable free play prize; and (3) adjust the number of winners and time length for each individual bonus level. This jackpot triggering functionality allows operators to control timing of the awarding of jackpots, providing added bonuses to their casino venues as they see fit (e.g., to entice active game play at particular times or during particular events).

FIG. 1 illustrates several different models of EGMs that could be specially configured to generate random based game outcomes using one or more symbol frame mechanic. As shown in FIG. 1, the EGMs, which are more generally referred to as gaming devices 104A-104X, may be networked to various gaming related servers. Shown is a system 100 in a gaming environment including one or more server computers 102 (e.g., slot servers of a casino) that are in communication, via a communications network, with one or more gaming devices 104A-104X (e.g., EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein. The server computers 102 may include a central determination gaming system server 106, a ticket-in-ticket-out (TITO) system server 108, a player tracking system server 110, a jackpot system server 112, a casino management system server 114, and/or a remote game play server 115. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of terminals, gaming devices 104A-104X, and/or other types of gaming devices (e.g., remote gaming devices) that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In some implementations, the bill validator 124 may also function as a "ticket-in" reader that allows the player to use a casino issued credit ticket to load credits onto the gaming device 104A (e.g., in a cashless TITO system). In such cashless implementations, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game feature. Bonus topper wheel 134 is typically used to play a bonus game feature, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.01 or $0.05), paylines, pay tables, and/or various game related graphics. In some implementations, the information panel(s) 152 may be implemented as an additional video display.

Figure 2A:
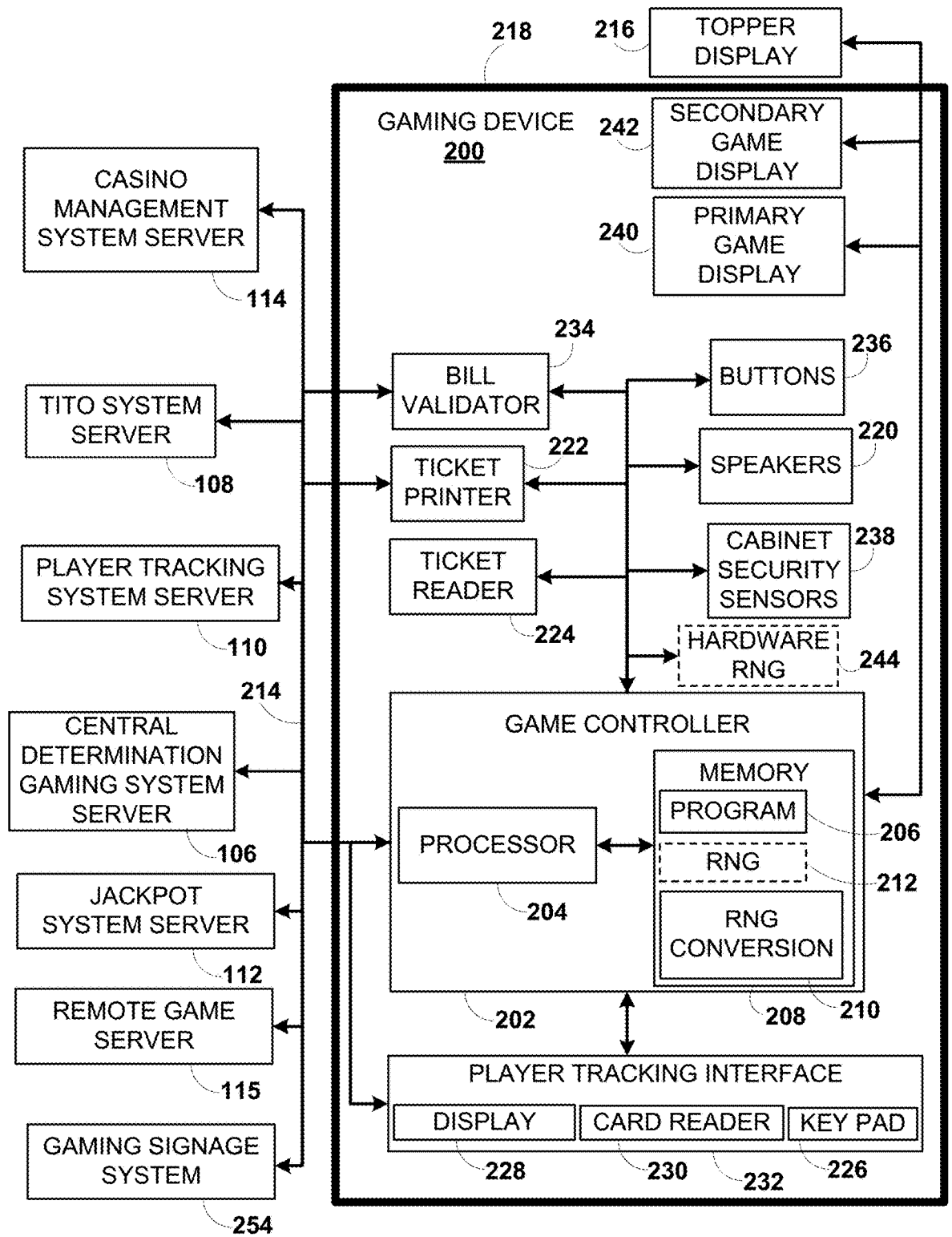
FIG. 2A is a block diagram showing various functional elements of an exemplary EGM.

Gaming devices 104A have traditionally also included a handle 132 typically mounted to the side of main cabinet 116 which may be used to initiate game play. Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game feature display for bonus play, to show game features or attraction activities while a game is not in play, or any other information or media desired by the game designer or operator. In some implementations, the optional topper screen 140 may also or alternatively be used to display progressive jackpots available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus game features, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2A also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that does not retain data values upon loss of power. Nonvolatile memory is memory that does retain data upon a loss of power. Examples of memory 208 include random access memory (RAM), read-only memory (ROM), hard disk drives, solid-state drives, universal serial bus (USB) flash drives, memory cards (e.g., Compact Fast (CFast) memory card), floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more backend gaming systems, such as a central determination gaming system server 106. For purpose of this disclosure, the term "game instance" refers to a play or a round of a game that gaming device 200 presents (e.g., via UI) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred throughout this disclosure as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features (e.g., bonus game feature, special mode, secondary game feature, and/or other supplemental game features). In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a predetermined level of RTP (e.g., RTP of at least 75%) for a game (also referenced throughout the disclosure as a "target game RTP"). A game can use one or more lookup tables (also referenced throughout this disclosure as "weighted tables") as part of a technical solution that satisfies regulatory requirements for randomness and RTP. In particular, a lookup table can integrate game features (e.g., trigger events for special modes or bonus game features; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target game RTP. In general, volatility refers to the frequency or probability of an event such as a special mode, payout, etc. For example, to achieve a specific target game RTP, a higher-volatility game may have a lower payout most of the time with an occasional bonus having a very high payout, while a lower-volatility game has a steadier payout with more frequent bonuses of smaller amounts. Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables and/or reel strips to translate the RNG outcome to a symbol element, stop position for a reel strip, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table and/or reel strips to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment, and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive game credit awards based on the outcome of winning instances. The credit balance is decreased by the amount of each wager and increased upon a win. The player can add additional game credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus game feature or select various items during a feature game). The player may make these selections using the player-input buttons 236, the primary game display 240 which may be a touch screen or using some other device which enables a player to input information into the gaming device 200.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2A. For example, not all gaming devices suitable for implementing the present disclosure, such as remote gaming devices, necessarily include top wheels, top boxes, information panels, cashless ticket systems, player tracking systems and/or an RNG. Specifically, one implementation of a remote gaming device may include processor 204, program 206, memory 208, primary game display 240, and speakers 220. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2A are examples to facilitate ease of description and explanation.

Figure 2B:
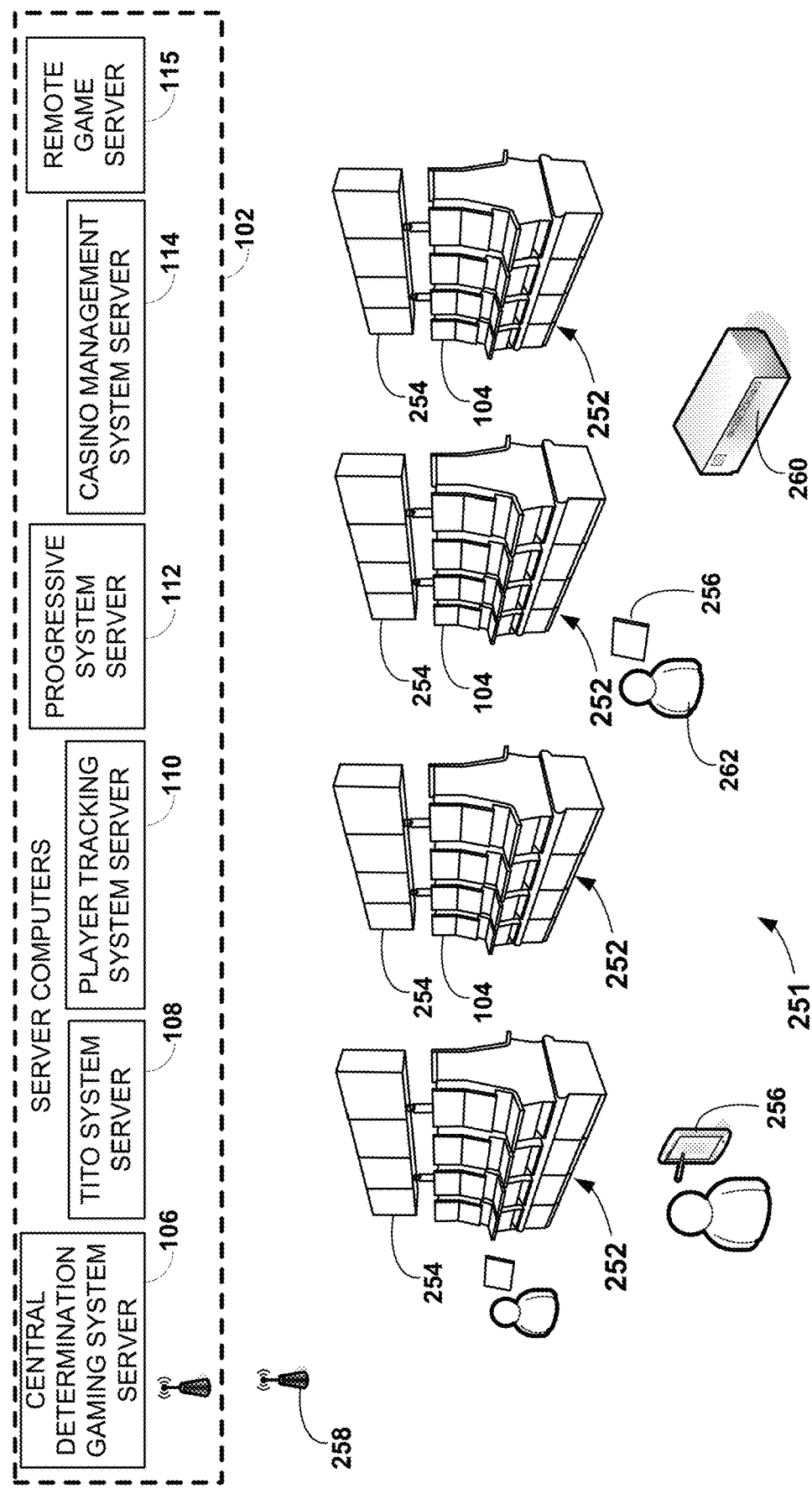
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may include tablet devices, cellular phones, smart phones, dedicated gaming consoles, and/or other handheld or portable devices. In this example, the mobile gaming devices 256 can be remote gaming devices configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, remote game server 115, and/or one of the EGMs 104 located on a casino floor. Some mobile gaming devices 256 may be configured to accept monetary credits from a credit or debit card, via a wireless interface (e.g., via a wireless payment app), via scanned checks and/or vouchers (e.g., prepaid game vouchers or TITO tickets), via a patron casino account (e.g., digital wallet), etc. As an example, to accept monetary credits, some mobile gaming devices 256 may include a camera, scanner, and/or ticket reader. In some implementations, the mobile gaming device 256 could include or be connected to a ticket printer to generate physical vouchers that can be used at EGMs 104.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via vouchers (e.g., prepaid game vouchers and TITO tickets), etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical UI (UI)) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
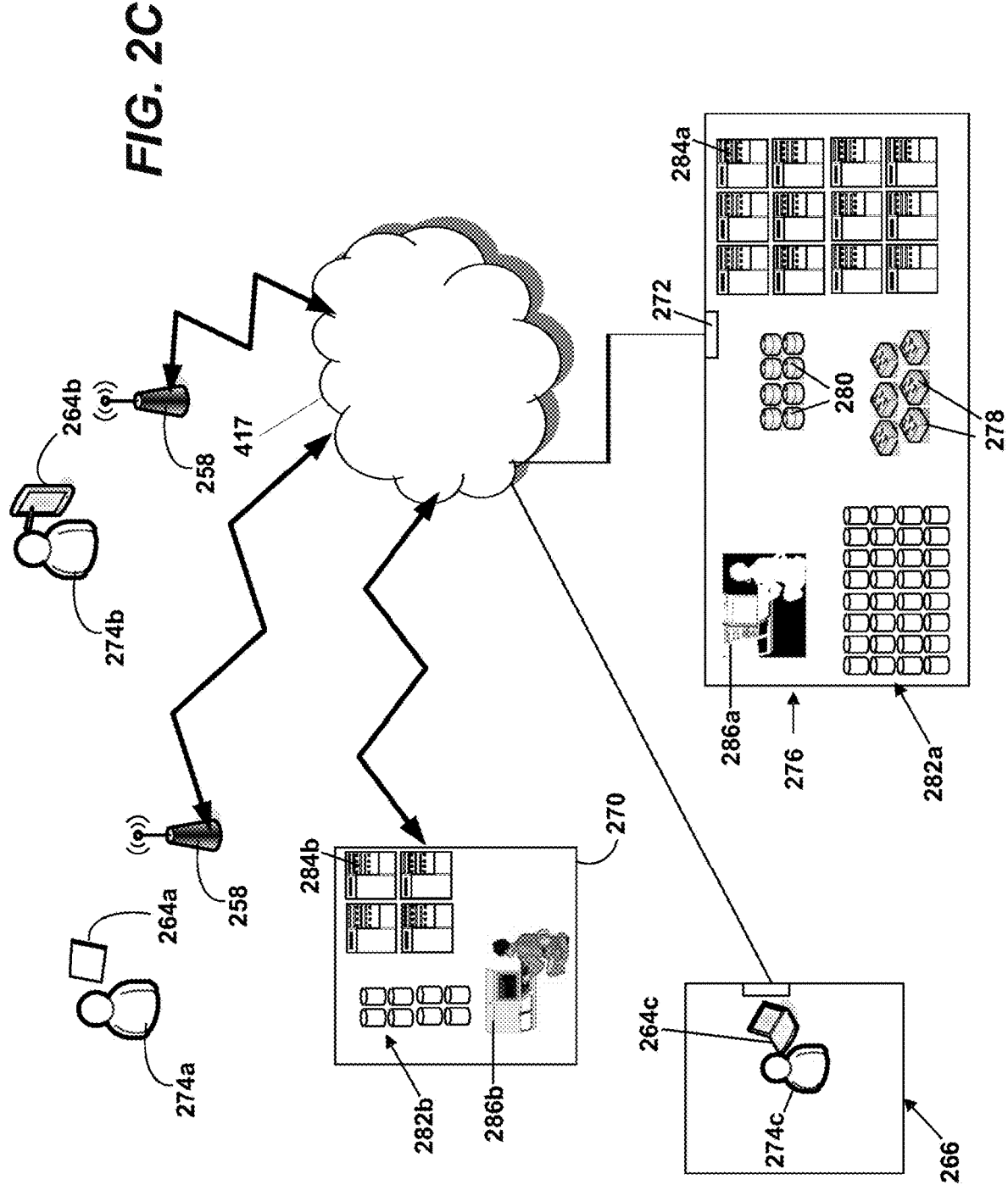
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c, which can also be referenced throughout the disclosure as "remote gaming devices," are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which game credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
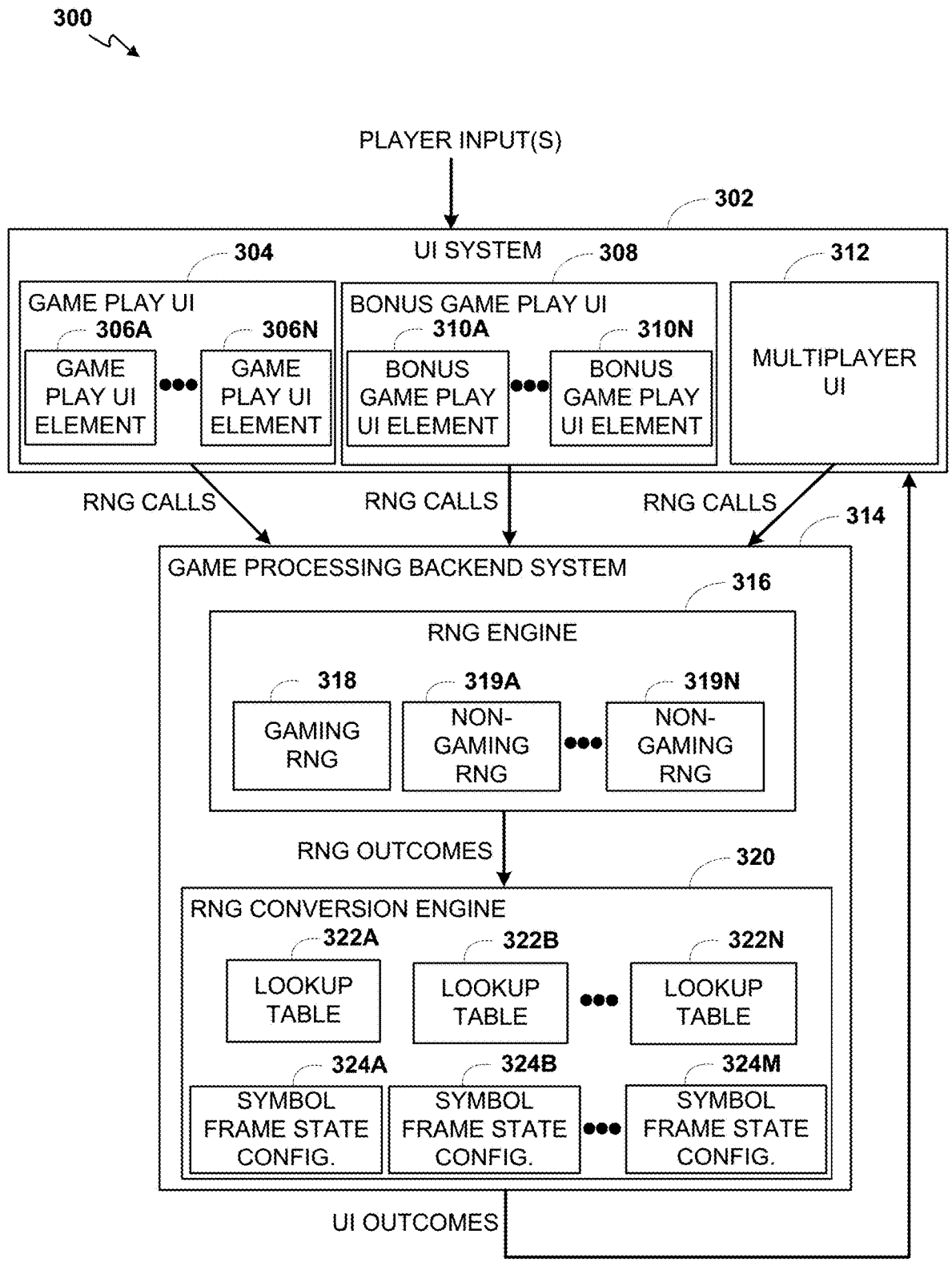
FIG. 3 illustrates, in block diagram form, an implementation of a game processing architecture that implements a game processing pipeline for the play of a game in accordance with various implementations described herein.

FIG. 3 illustrates, in block diagram form, an implementation of a game processing architecture that implements a game processing pipeline 300 for the play of a game in accordance with various implementations described herein. As shown in FIG. 3, the gaming processing pipeline 300 starts with having a UI system 302 receive one or more player inputs for the game instance. Based on the player input(s), the UI system 302 generates and sends one or more RNG and/or game initiation calls to a game processing backend system 314. Game processing backend system 314 then processes the RNG and/or game initiation calls with RNG engine 316 to generate one or more RNG outcomes, for example random numbers or a sequence listing. The RNG outcomes are then sent to the RNG conversion engine 320 to generate one or more game outcomes for the UI system 302 to display to a player. A gaming device, such as gaming devices 104A-104X and 200 shown in FIGS. 1 and 2A, respectively, can implement the game processing pipeline 300. Alternatively, portions of the game processing pipeline 300 can be implemented using a remote gaming device and one or more backend gaming systems, such as central determination gaming system server 106 and/or remote game server 115 shown in FIG. 1.

The UI system 302 includes one or more UIs that a player can interact with. Using FIG. 3 as an example, the UI system 302 includes one or more game play UIs 304, one or more bonus game play UIs 308, and one or more multiplayer UIs 312, where each UI type includes one or more mechanical UIs and/or GUIs. In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels in a reel area) are shown and/or made available to a user. In a subsequent game instance, the UI system 302 could transition out of the base game to one or more bonus game features. The bonus game play UI 308 represents a UI that utilizes bonus game play UI elements 310A-310N for a player to interact with and/or view during a bonus game feature. In one or more implementations, at least some of the game play UI element 306A-306N are similar to the bonus game play UI elements 310A-310N. In other implementations, the game play UI element 306A-306N can differ from the bonus game play UI elements 310A-310N.

In one or more implementations, the game processing pipeline 300 can incorporate the example implementations described herein into various types of reel games. In particular, a reel game includes a base reel game shown with game play UI 304 and bonus reel game shown with bonus game play UI 308. Generally, a base, or primary, reel game includes play that involves spinning reels. A bonus reel game can add the possibility of winning a relatively large payout. A bonus reel game may require an additional wager, but typically does not. For purposes of this disclosure, a bonus reel game can be a type of supplemental game feature the game processing pipeline 300 can implement.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG and/or game initiation calls to a game processing backend system 314. As an example, the UI system 302 could use one or more application programming interfaces (APIs) to generate the RNG and/or game initiation calls. To process the RNG and/or game initiation calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player.

RNG conversion engine 320 could also utilizes one or more lookup tables 322A-322N, which are also called weighted tables, to regulate a prize payout amount for each RNG outcome and how often the gaming device pays out the derived prize payout amounts. To do so, RNG conversion engine 320 can determine various game outcomes and perform operations for various types of base game features and/or supplemental game features (e.g., a bonus game feature). Although not shown in FIG. 3, the RNG conversion engine 320 could store and/or utilize one or more sets of reel strips, where each set of reel strips has different reel strip patterns. The RNG conversion engine 320 can also store (e.g., as data structures) and/or utilize one or more lookup tables 322 to assign probabilities to different options. For example, the RNG conversion engine 320 selects one of the different options based on a random number for the RNG outcome, where the different options are represented in different entries of a lookup table 322.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game feature, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline 300. In one or more implementations, instead of sending the UI outcome back to the UI system 302, the game processing backend system 314 can send information related to the UI outcome (e.g., RNG seed, the number of spins, payout amount) to the UI system 302. After receiving information related to the UI outcome, the UI system 302 may derive and determine how to present the UI outcome.

Figure 4:
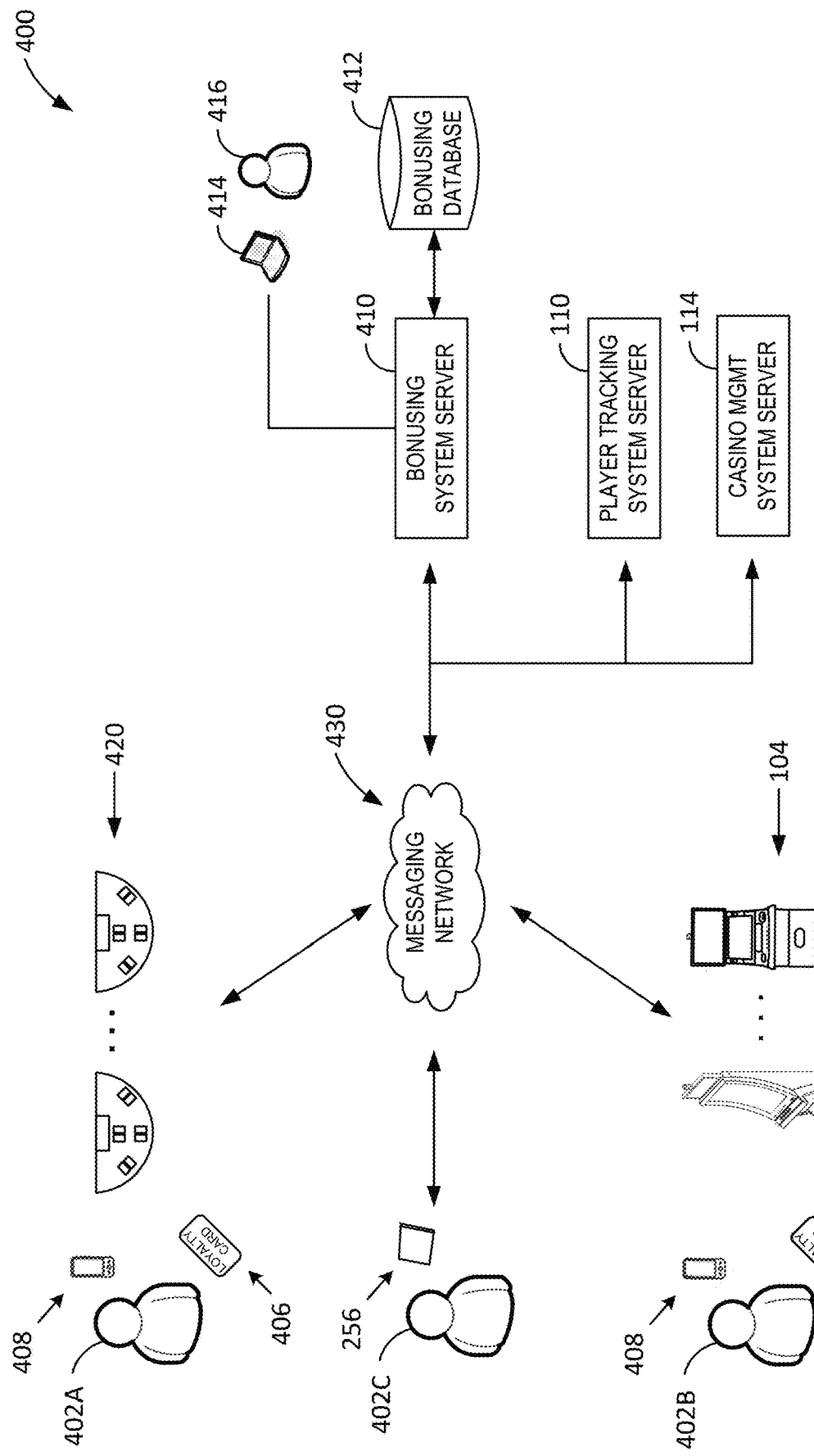
FIG. 4 is an architectural diagram of an example bonusing system for providing integrated bonusing (e.g., shared jackpots) across various types of gaming devices

FIG. 4 is an architectural diagram of an example bonusing system 400 for providing integrated bonusing (e.g., shared jackpots) across various types of gaming devices. In the example embodiment, the bonusing system 400 includes a bonusing system server 410 and associated bonusing database 412 that provides various types of bonusing functionality to players 402 of various types of gaming devices, including various EGMs 104, table games 420, and mobile gaming devices 256. The bonusing system 400 may, for example, provide shared jackpots that are eligible to be won across disparate device types (e.g., a single jackpot that can be won by table players 402A, EGM players 402B, or mobile players 402C). Further, in some embodiments, the bonusing system 400 may provide "on demand" jackpots to players 402 across the various participating devices (e.g., based on criteria set by jackpot administrators 416 rather than being tied to game outcomes). While the examples shown here are primarily described with respect to EGMs 104, table games 420, and mobile gaming devices 256, it should be understood that support for other types of gaming devices are possible. For example, the bonusing system 400 may support class-2 gaming devices (e.g., bingo-based games), class-3 gaming devices (e.g., slot machines, bartop video-based gaming devices), mobile gaming (e.g., mobile class-2 gaming, virtual currency gaming, iGaming), historical horse racing ("HEIR") gaming devices, server-based central determination gaming systems, live dealer online game play, lottery-based gaming devices, sports wagering devices, and the like. In some embodiments, the bonusing system 400 can be integrated with any third-party system that tracks game play in real time. In some embodiments, the bonusing system server 410 may be similar to the jackpot system server 112 shown in FIG. 1.

In the example embodiment, the bonusing system server 410 monitors and manages active gaming sessions at the various supported devices. In some cases, the bonusing system server 410 may associate some active gaming sessions with particular players 402. For example, the bonusing system server 410 may identify rated gaming sessions (or "carded sessions") for known players when those players 402 "card into" an EGM 104 or table game 420 (e.g., via swiping a loyalty card 406 or presenting their loyalty card 406 to a dealer at a table game 420, or via cardless connection using mobile devices 408 of the players 402). In some cases, active gaming sessions may be tracked for unknown players (e.g., "uncarded sessions," where the player 402 does not have or otherwise has not presented a loyalty card 406 during the gaming session, but establishes a credit balance by presenting a TITO ticket or cash to an EGM 104). The bonusing system server 410 may also identify active gaming sessions with particular gaming devices. With EGMs 104, for example, each EGM 104 may be identified with a unique machine identifier and, as such, any active gaming session at that EGM 104 may be identified and associated with that EGM 104. With table games 420, the bonusing system 400 may identify each table game 420 with a particular unique table identifier and may further identify individual positions with unique position identifiers (e.g., unique within that table 420, or unique within all tables 420). As such, each player position at a table 420 may be uniquely defined and individually eligible for participation in the jackpot, and player sessions may be established and tracked for each player position (e.g., card in and card out events as players come and go from player positions) and for each wager during each game round (e.g., as a "coin in" type event). Similarly, active online gaming sessions may be associated with particular players 402 or particular online devices (e.g., via unique player login IDs, mobile device IDs, carded online play, or the like). The bonusing system server 410 may receive "card in" and "card out" events from the various participating devices as players 402 begin and end session play (e.g., when carding into or cashing out of an EGM 104 or from a table game 420). As such, for various active gaming sessions, the bonusing system 400 may track and store associations between the active gaming session and a particular player 402, a particular device 104, 420, 256, 408, or both. This active gaming session information allows the bonusing system 400 to facilitate various aspects of bonusing described herein. In some embodiments, such active gaming session information may be managed by the player tracking system server 110, the casino management system server 114, or other system servers, and may be accessed by the bonusing system server 410 as needed.

As such, the jackpot system 400 receives various messages from participating devices (e.g., via messaging network 430) that facilitates participation in the shared jackpots. For example, the jackpot system 400 may receive session start event messages from EGMs 104 when the player 402B manually swipes their loyalty card 406 at the EGM 104, when the player 402B cardlessly establishes a gaming session at the EGM 104 via their mobile device 408, when the player 402 redeems a TITO ticket for value at the EGM 104, or when the player 402B initially inserts cash into the EGM 104 or performs a digital wallet-based transaction to establish a credit balance at an idle the EGM 104. The jackpot system 400 may receive session start event messages from tables 420 when a dealer cards the player 402A into their table 420 or a particular position at their table 420, when the player cardlessly connects to the table 420 (e.g., via wireless connection with their mobile device 408), when the player 402A redeems a TITO ticket for value at an EGM 104, or when the player 402A initially cashes into game play at the table 420 to establish a chip balance by providing cash to the dealer or performing a digital wallet-based transaction in exchange for chips at the table 420. The jackpot system 400 may receive session start event messages from mobile gaming devices 256 when the player 402C logs into the mobile gaming device 256, establishes a credit balance for online game play (e.g., via funds transfer, digital wallet transaction, or the like), or selects a game to begin playing on the mobile gaming device 256.

Such session start event messages may include device information (e.g., EGM ID, table ID and/or position ID, mobile device ID, login ID, cell phone number, or the like, of the participating device), user information (e.g., loyalty ID of the player 402 or their loyalty card 406, login ID of the player 402), and a timestamp (e.g., identifying when the session started). The jackpot system 400 may create a unique gaming session ID for this new gaming session, or may receive the unique gaming session ID from the participating device or other backend system. In some embodiments, the jackpot system 400 may provide the gaming session ID back to the participating device, and that participating device may subsequently include the gaming session ID in later event messages associated with that gaming session.

During active gaming sessions, the jackpot system 400 may also receive wager event messages from the participating devices for each particular active gaming session. Wager event messages are generated by the various participating devices 104, 420, 255 when a game round occurs and a wager is placed for the active gaming session. For example, the jackpot system 400 may receive a wager event message from an EGM 104 or other backend server when the player 402B presses a spin button on an EGM 104 providing a slot-based game, or when the player 402B begins a round of play of video poker at a bartop EGM 104. The jackpot system 400 may receive a wager event message from a table 420 or other backend system when a game round begins at the table 420 (e.g., as automatically detected by device hardware at the table 420, when initiated by the dealer at the table 420) and when the player 402A has provided a wager in chips during this round of play (e.g., as automatically detected by RFID sensor data sensing wager chips and/or wager amount within a wager area at the position associated with the player 402A, as an estimated per-hand average wager amount of the player provided by the dealer or supervisor). The jackpot system 400 may receive a wager event message from a mobile gaming device 256 when the player 402C begins a round of game play on the mobile gaming device 256 (e.g., video-based wagering games or events such as video-based slots, poker, blackjack, keno, sports betting, or the like).

The wager event messages may include device information (e.g., of the participating device, similar to that described above for session event messages), user information (e.g., of the participating user, similar to that described above for session event messages), a wager amount (e.g., an amount originally provided at the beginning of the game round, an additional wager amount provided during the game round), and a timestamp (e.g., of the beginning of the round, the submissions of the wager amount). In some embodiments, the wager event message may identify a progressive contribution amount of the wager to apply to a progressive jackpot, or the jackpot system 400 may automatically determine a progressive contribution amount to apply to a progressive jackpot. In some embodiments, the jackpot system 400 may apply the progressive contribution amount to the progressive jackpot by, for example, incrementing the progressive jackpot by the progressive contribution amount directly, or by transmitting a progressive contribution message to a jackpot system server 112 that manages the progressive jackpot. As such, the jackpot system 400 is able to identify when a wager takes place on the various types of participating devices 104, 420, 256, and to collect various data about the game being played and the wagers being provided.

Similarly, the jackpot system 400 may receive session termination event messages from the participating devices for each particular active gaming session. For example, the jackpot system 400 may receive session termination event messages from EGMs 104 when the player 402B cashes out at the EGM 104 (e.g., presses a "cash out" button on the EGM 104), zeros out the credit balance at the EGM 104, cards out of the EGM 104, wirelessly disconnects their mobile device 408 from the EGM 104, or after a predetermined amount of idle time at the EGM 104. The jackpot system 400 may receive session termination event messages from tables 420, for example, when the dealer identifies that the player 402A has terminated their game play session (e.g., via a table management device, after the player 402A departs from the table 420 or otherwise vacates their position), when the player 402A wirelessly disconnects their mobile device 408 from the table (e.g., via disconnecting via a player app on the mobile device, when the device 408 loses wireless connectivity to the table 420), or after a predetermined amount of idle time (e.g., the table 420 detecting no wagers being placed) at the player position. The jackpot system 400 may receive session termination event messages from mobile gaming devices 256, for example, when the player 402C logs out of the mobile gaming device 256, terminates their gaming session on the mobile gaming device 256, when the mobile gaming device 256 loses power or loses wireless connectivity with a local area network at a gaming venue, or when the mobile gaming device 256 is moved outside of a predetermined geographic area (e.g., a geofenced area).

Such session termination event messages may include device information (e.g., EGM ID, table ID and/or position ID, mobile device ID, login ID, cell phone number, or the like, of the participating device), user information (e.g., loyalty ID of the player 402 or their loyalty card 406, login ID of the player 402), a termination type (e.g., what condition(s) prompted the termination event), and a timestamp (e.g., identifying when the session was terminated at the device).

As such, the jackpot system 400 is able to identify when a new gaming session is initiated on these various types of gaming devices, to subsequently track other events associated with that active gaming session (e.g., wager events, session end events, and the like), and to determine when an active gaming session is terminated. Further, the jackpot system 400 is able to collect various gaming session data that may be used to determine eligibility for various types of jackpots and facilitate awarding such jackpots, as described in further detail below.

In the example embodiment, the bonusing system server 410 establishes and manages one or more "shared jackpots" across the various devices 104, 420, 256, 408. In one example, a static shared jackpot may be provided by the bonusing system 400. A static shared jackpot may identify a preconfigured jackpot amount for the jackpot (e.g., $500) or a particular prize (e.g., sports team jersey, tickets to a show, free night stay, or the like). A static shared jackpot may identify a preconfigured range (e.g., via a minimum value and a maximum value) and the value awarded by the jackpot may be a value within the range, based on an RNG output.

In another example, a shared progressive jackpot may be provided by the bonusing system 400. With shared progressive jackpots, the size of the jackpot may grow as players 402 play on the participating devices, where each instance of game play (e.g., each wager) may contribute a small amount to the jackpot. For example, with progressive jackpots on EGMs 104, a small fraction of each wager amount (also referred to herein as "coin in") on each device participating in that progressive jackpot may be directed to the progressive jackpot total, thereby causing the progressive jackpot to grow over time. In some embodiments, the bonusing system 400 may also facilitate participation in shared progressives by table games 420. For example, some table games 420 may be configured to track aspects of real-time game play data for the table game, such as per game round data (e.g., when a game round starts/ends) and wager data (e.g., how much each player bets during the game round, the wager outcome for each player). Such real-time game play data may be determined using, for example, RFID-enabled chips and cards, RFID sensors integrated into the tables 420, or the like. As such, the bonusing system 400 may be configured to identify "coin in" for each round of game play on a particular table 420, and for each instance of play for each particular player 402A at that table 420. The bonusing system server 410 may thus add a contribution amount to the progressive jackpot per instance of play (e.g., a fixed amount, a fraction of an actual wager amount, or the like). In some embodiments, the bonusing system 400 may also facilitate participation in shared progressives by mobile devices 256. In such embodiments, the bonusing system server 410 may track each game instance played by players 402C on participating mobile devices 256 and may thus similarly add a contribution amount to the progressive jackpot per instance of play.

Some shared jackpots may be awarded based on game outcomes. This award trigger type is referred to herein as "outcome-based jackpot awards." Outcome-based jackpot awards are triggered based on an outcome of a game instance. For example, in slot-style games on EGMs 104 or mobile devices 256, a shared jackpot may be configured to be won when a spin results in a jackpot symbol appears in a winning combination (e.g., when RNG outcomes cause the reels to generate such a condition). In card games at tables 420, or virtually on EGMs 104 or mobile devices 256, a shared jackpot may be configured to be won when the player 402A achieves a particular hand outcome (e.g., a royal flush in poker-style games, a 5-card 21 in blackjack-style games, or the like). The administrator 416 may configure the award trigger types for a particular shared jackpot across the various game types provided by the participating devices, thereby establishing the conditions upon which a win event is triggered. Further, to administer such shared awards, the bonusing system server 410 may be configured to receive game outcome data from the participating devices and trigger the awarding of the shared jackpot based on the configured conditions.

Some shared jackpots may be awarded based on per-game plays. This award trigger type is referred to herein as "per-play jackpot awards." Per-play jackpot awards are conditionally triggered per each play of participating games, but are independent of the outcome of the underlying game. For example, the bonusing system 400 may be configured to provide a preconfigured chance to win the shared jackpot for each game instance played at the participating device (e.g., based on an RNG outcome). The shared jackpot may, for example, be configured with a 0.001% chance to win during each game instance (e.g., during each reel spin at an EGM 104, during each hand dealt at a table 420, during each online game play on a mobile device). As each game instance (e.g., coin in event) is received by the bonusing system server 410, the bonusing system server 410 may generate an RNG for that game instance to determine whether or not that game instance wins the shared jackpot. As described above, the bonusing system 400 may track each game instance at EGMs 104, table games 420, and mobile devices 256, and as such may centrally determine when a particular game instance wins the shared jackpot.

Some shared jackpots may be awarded based on preconfigured timing. This award trigger type is referred to herein as "temporal jackpot awards," which may also be referred to here as "time-based awards" or "on-demand awards." Temporal jackpots awards are awarded based on a preconfigured timing of the award rather than the randomness of RNG outputs for triggering an award. In other shared jackpot award trigger types, the timing of when an award is provided may be subject to RNG outputs (e.g., the RNG-determined game outcomes of outcome-based jackpot awards, or the RNG-determined trigger of per-play jackpot awards). With temporal jackpot awards, the bonusing system 400 is configured with the timing setting that defines when to award the shared jackpot. In the example embodiment, the bonusing system 400 allows administrators 416 to configure a trigger time for the awarding of the shared jackpot, and also allows the administrators 416 to configure conditions of eligibility for the shared jackpot. For example, an operator may wish to award a shared jackpot at a particular time of day (e.g., every hour, daily at 2pm, or on demand when a floor manager initiates the award).

In another embodiment, the jackpot system 400 may provide a threshold-based (or "value-based") jackpot award, allowing the administrators 416 to configure the awarding of a jackpot after the jackpot has reached a predetermined threshold. For example, in one embodiment, a value-based progressive jackpot may be configured with a starting value, a minimum value, a maximum value, and optionally an average value. A starting value, such as $1,000, defines the value at which the progressive jackpot starts (e.g., initially, after an award or reset). A minimum value defines the value at which the progressive jackpot becomes eligible to be won. For example, the administrator may configure this example progressive jackpot to become eligible to be won once the jackpot reaches $10,000. A maximum value defines a cap value for the jackpot. The jackpot system 400 may treat this maximum value as a trigger for awarding the jackpot if the jackpot has not yet been awarded (e.g., selecting a jackpot winner from a pool of currently eligible players/devices at the time the maximum is reached). In other embodiments, the jackpot system 400 may stop incrementing the progressive jackpot (e.g., stop collecting progressive contributions, or redirecting progressive contributions to another target other than this particular jackpot) and may increase weights for chances of winning the jackpot for each game play. Optionally, the jackpot may also be configured with an average jackpot value that defines a target average value for awards of the jackpot over time. The jackpot system 400 may weight chances to win the jackpot based on the average jackpot value (e.g., increasing the weight of winning percentage as the actual jackpot value increases). For example, the jackpot system 400 may calculate a weighted chance for each play based on the current value of the jackpot, the defined target average value, and the minimum and maximum values. In other words, such a value-based jackpot is awarded to a random game play (once the minimum value is satisfied), but weighted such as to make likelihood of the award timing to be centered around the average.

The operator may further define certain eligibility conditions for jackpot awards, such as player-based eligibility, device-based eligibility, or play-based eligibility. Player-based eligibility conditions identify which players are eligible for a particular award instance of the shared jackpot and can include temporal player eligibility (e.g., all currently active players, all known players active within the past amount of time) and may include loyalty eligibility (e.g., players of a particular loyalty level or tier, enrolled date, card in count) or player demographic data (e.g., for carded/known players, gender, age, or the like). Device-based eligibility identifies which devices are eligible for the jackpot award and can include particular devices (e.g., by unique device ID) or particular types of devices (e.g., all EGMs 104 and table games 420 at a particular property, particular device manufacturers, particular bonus methods, particular game themes, particular denominations, particular platforms, particular locations on casino floor, particular pay table, particular game number). Play-based eligibility conditions identify play conditions that limit eligibility for a particular award instance of the shared jackpot and can include wager minimums (e.g., only players playing max bet on EGMs 104 during their most recent play, only players wagering at least $20 at tables 420 during their most recent play), wagering outcomes (e.g., only players having aggregate losses exceeding a predetermined amount over the past amount of time, points earned, coin in, theoretical win, time played), aggregate wagering totals or loyalty points earned totals (e.g., only players having wagered a total amount or earned a total amount of loyalty points over a predefined threshold within the last period of time, such as at least $1,000 in the last 24 hours), game play time (e.g., only players having played at least a preconfigured amount of time within the last period of time, such as at least 2 hours of game play in the last 24 hours), or jackpot history (e.g., some jackpots may be configured to be available after a threshold number of other jackpots have been awarded at the EGM 104). As such, administrators 416 may use the various conditions of temporal or threshold jackpot awards to define when such shared jackpots get awarded. It should be understood that various combinations of these eligibility criteria may be configured together for a particular jackpot.

When a particular temporal jackpot award or threshold jackpot award is triggered, the bonusing system server 410 uses the predefined conditions of the temporal jackpot award, in conjunction with the current conditions of gaming sessions as needed, to determine a pool of eligible players, gaming sessions, or devices for this instance of the temporal jackpot award. Once a pool of eligible players is identified, the bonusing system serer 410 uses RNG output to identify which player or device from the pool wins the award. In some embodiments, each eligible player may have an equal chance to win the shared jackpot. In other embodiments, the bonusing system server 410 may use a weighted table to determine which player from the pool wins the shared jackpot. For example, the administrator 416 may define weighted conditions for various aspects of the award, such as weighted loyalty level (e.g., higher weight for higher loyalty levels), weighted average wager amounts (e.g., higher weight for higher average wagering), weighted session time (e.g., higher weight for those players with longer continuous or daily game session time), weighted device or game types (e.g., higher weights for players on particular types of devices or playing particular types of games). As such, the bonusing system server 410 may create an aggregate weight for each player in the eligibility pool using each of the configured weights for this instance and may use the RNG output against this weight table to select a particular player to win this instance of the shared jackpot.

When a shared jackpot is awarded by the bonusing system 400, the shared jackpot is provided to the winning player. The jackpot system 400 may transmit a jackpot award event message back to the winning device. In some embodiments, the amount of the shared jackpot may be provided as credit to the device on which the winning player is currently active (e.g., as credit added to the EGM, as credit added to a gaming balance on the mobile device 256). In some embodiments, the amount of the shared jackpot may be provided in chip value or TITO ticket to players 402A at table games 420 (e.g., via TITO ticket printing at the table 420, via notification to the dealer at the table 420 and subsequent hand-out of chips). In some embodiments, the amount of the shared jackpot may be provided indirectly to the player via a direct deposit of the award into their loyalty account or mobile device 408 (e.g., as credit to a play account associated with their loyalty account, as deposit to a digital wallet of the winning player). The winning player 402 may be notified by, for example, pop up message on the winning EGM 104 or mobile device 408, 256, or through a dealer notification at the winning table 420. In some embodiments, the bonusing system 400 may display jackpot wins via signage at the winning property (e.g., locally near the winning device).

In some embodiments, the bonusing system 400 may include and support devices 104, 420, 256 across multiple gaming operators, multiple properties of the same gaming operator, and across various geographies. As such, these shared jackpots may be configured not only across disparate device types and game types, but also may be offered and shared amongst different operators and geographies, thereby allowing wider participation in jackpots, and potentially larger jackpot awards.

Figure 5:
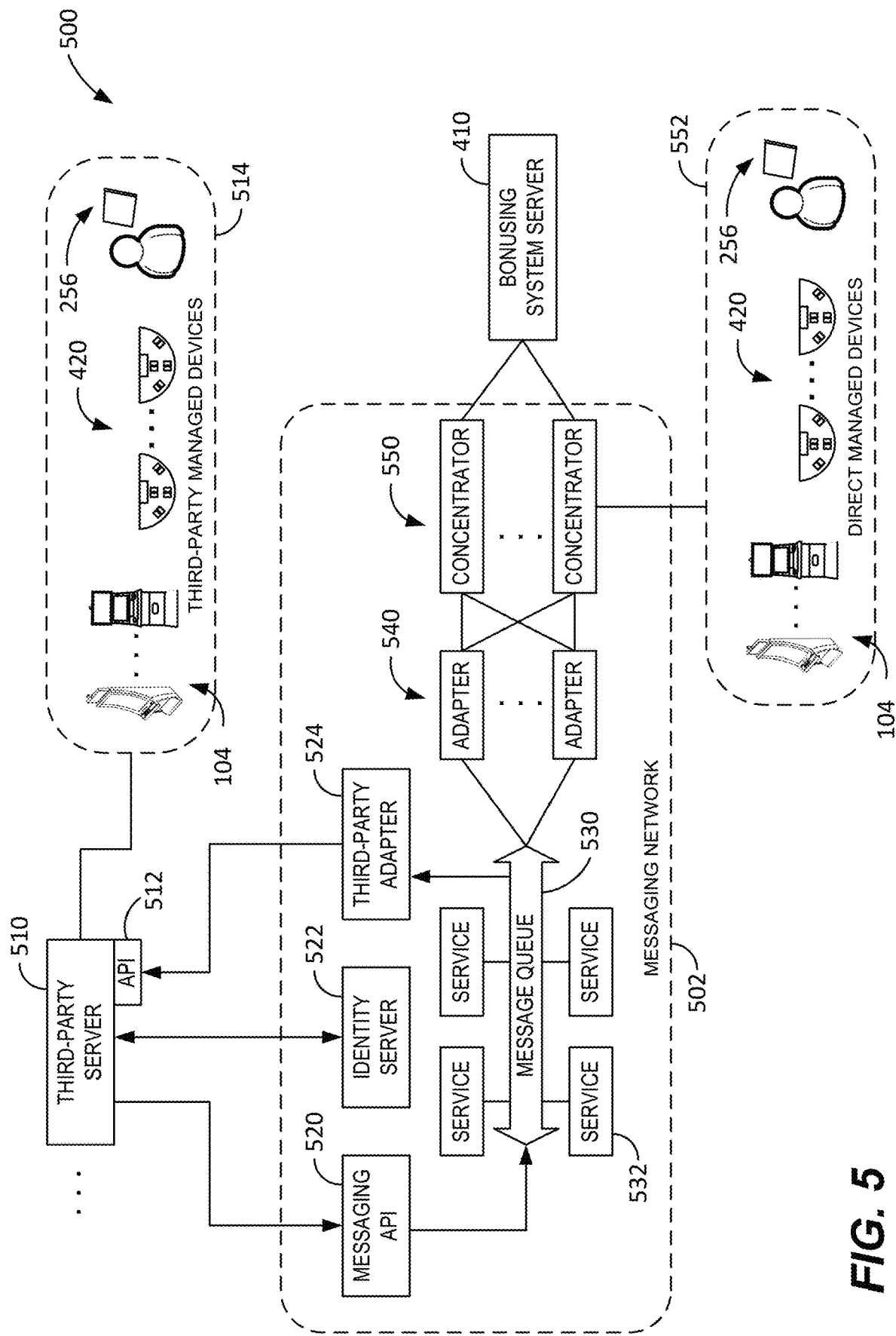
FIG. 5 illustrates an example bonusing system with a messaging network that may be used for providing integrated bonusing (e.g., shared jackpots) across various types of gaming devices.

FIG. 5 illustrates an example bonusing system 500 with a messaging network 502 that may be used for providing integrated bonusing (e.g., shared jackpots) across various types of gaming devices. The bonusing system 500 may be similar to the bonusing system 400 shown in FIG. 4, and the messaging network 502 may be similar to the messaging network 430 shown in FIG. 4. In the example embodiment, the bonusing system 500 supports bonusing integration across both a pool of direct managed devices 552 and a pool of third-party managed devices 514. The direct-managed devices 552 may be similar to the devices 104, 420, 256 as shown and described in relation to FIG. 4, and such direct-managed devices 552 may directly communicate with the bonusing system server 410 via a set of concentrators 550 (e.g., that facilitate passing event messages between the direct managed devices 552 and the bonusing system server 410).

In the example embodiment, the messaging network 502 is configured to communicate with a third-party server 510 to facilitate participation in jackpots provided by the bonusing system server 410 for third-party managed devices 514. More specifically, the messaging network 502 provides a messaging API 520 that receives event messages from the third-party server 510. The third-party server 510 communicates directly with the third-party managed devices 514, for example, to identify gaming session start and termination events, or to identify the occurrence of wagering events. The third-party server 510, in some embodiments, may identify such events similar to the bonusing system 400 and events described above in reference to FIG. 4 (e.g., via device data received from the third-party managed devices 514). The third-party server 510 creates and transmits session start event messages, session termination event messages, and wager event messages to the messaging API 520 as such events occur on the third-party managed devices 514. These event messages may be similar to the event messages described above in reference to FIG. 4 (e.g., identifying when gaming sessions begin and end on the third-party managed devices, identifying when wagering events occur on third-party managed devices, providing device information, gaming session information, or player information of the associated devices or players, providing wager contribution amounts for progressive jackpots, and the like). In some embodiments, the bonusing system 500 may receive device registration event messages from the third-party server 510. These device registration event messages provide device details for each of the third-party managed devices 514 supported by the third-party server 510. Device registration is provided to allow the bonusing system 500 to establish certain details about third-party managed devices 514, such as unique device IDs, device types, game types provided, seat positions or unique position IDs (e.g., for table game), login IDs or loyalty IDs or mobile device IDs (e.g., for mobile device players 402C, for players 402 establishing carded gaming sessions, for players 402 wirelessly connecting with their mobile devices 408). The bonusing system server 410 may thus recognize, register, and consider eligibility of the various third-party managed devices 514 for the various jackpots provided by the bonusing system 500.

In the example embodiment, the messaging API 520 may provide a messaging protocol that is different than a messaging protocol used between direct managed devices 552 and the bonusing system server 410 or concentrators 550. As such, the messaging network 502 provides a message queue 530 and a set of adapters 540 that are configured to receive and manage a queue of event messages and convert those event messages into a format and protocol understood by the bonusing system server 410 and associated concentrators 550. For example, in one embodiment, the messaging API 520 may act as a RESTful API ("representational state transfer"), receiving event messages from the third-party server(s) in XML, HTML, or JSON format and may provide event messages in Advanced Message Queuing Protocol (AMQP) to the message queue 530. In the example embodiment, the message queue 530 is provided by RabbitMQ, an open source message broker (made available under Mozilla Public License) that provides various services 532 and a set of adapters 540 that are configured to convert AMQP messages into streaming text oriented messaging protocol (STOMP), and vice versa, when communicating with the concentrators 550. For example, incoming session start event messages, wager event messages, and session termination event messages may be received from third-party server(s) 510 via the messaging API 520, provided onto the message queue 530 and adapters via AMQP, and converted into STOMP when forwarded to the concentrators 550 enroute to the bonusing system server 410.

Further, the bonusing system 500 also facilitates certain communications back to the third-party server 510. For example, when a device is registered (e.g., after processing of a device registration event message), the bonusing system server 410 may transmit a registration confirmation message back to the third-party server 510. When a session termination event message is received by the bonusing system server 410, the bonusing system server 410 may transmit a session termination confirmation message back to the third-party server 510. When a jackpot is awarded to one of the third-party managed devices 514, the bonusing system server 410 may transmit a jackpot award event message to the third-party server 510 identifying which third-party managed device 514 has been awarded the jackpot, and perhaps other jackpot details such as the jackpot amount, a jackpot payout type (e.g., credit to device, credit to account, dealer to pay at table, or the like). Such messages may be transmitted from the bonusing system server 410 through concentrators 550 and adapters 540 and out through a third-party adapter 524 that is configured to communicate with an API 512 of the third-party server 510, where each stage of communication may include a message protocol conversion in reverse of the inbound communications described above.

While only one third-party server 510 and pool of third-party managed devices 514 is illustrated in FIG. 5, it should be understood that the architecture provided by the messaging network 502 of the example jackpot system 500 may be configured to support many third parties and various types of gaming devices. For example, the jackpot system 500 may include a third-party server 510 that exclusively supports table games 420, several third-party servers 510 that each individually support EMGs 104, table games 420, and/or mobile gaming devices 256 at various particular gaming properties, several third-party servers 510 that provide mobile gaming platforms for mobile gaming devices 256 or electronic gaming on mobile devices 408 (e.g., mobile class-2 gaming, virtual gaming, or the like), and may also support various direct managed devices 552 at one or more gaming properties.

Figure 6:
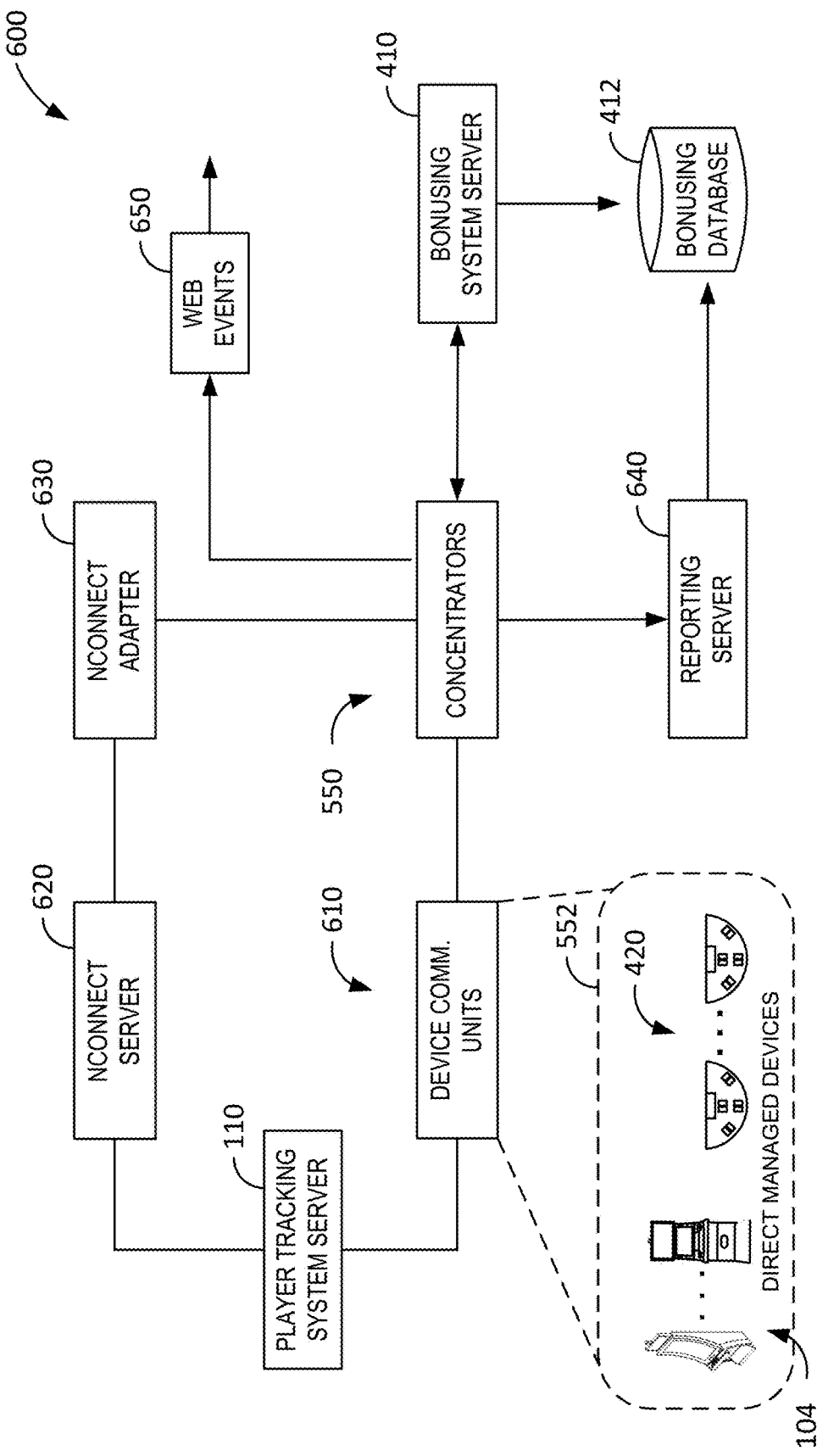
FIG. 6 is an example architecture and data flow diagram illustrating aspects of a jackpot system.

FIG. 6 is an example architecture and data flow diagram illustrating aspects of a jackpot system 600. In some embodiments, the jackpot system 600 may be similar to the jackpot systems 400, 500 shown in FIGS. 4 and 5. In the example embodiment, some or all of the direct managed devices 552 may include device communication units 610 that provide game play data during gaming sessions. The device communication units 610 may be a hardware appliance installed within the direct managed devices 552 such as the nCompass units provided by the OASIS 360 system and made commercially available by Aristocrat® Technologies, Inc. In some embodiments, the device communication units 610 may include slot machine interface board (SMIB) devices installed within the direct managed devices 552.

The device communication units 610 may, for example, allow players 402 to establish a carded game play session at direct managed devices, wirelessly connect with their mobile devices 408, or otherwise may provide game play data that may be used by the jackpot system 600. The device communication units 610, or the game play session data provided by the device communications unit 610, may be used to generate session start and session termination event messages (e.g., as the players 402 cash into or cash out of the devices 104, 420) and may likewise provide wager event messages (e.g., coin in data) during game play sessions at the direct managed devices 552. The device communication units 610 communicate with the bonusing system server 410 via the concentrators 550. Further, the device communication units 610 may communicate with the player tracking system serer 110 (e.g., for establishing carded session play, for tracking game play session data, or the like).

The device communication units 610 In the example embodiment, the jackpot system 600 also includes a reporting server 640 that provides reporting services for the jackpot system 600. The reporting server 640 allows operators or administrators to generate reports associated with the jackpots provided by the jackpot system 600. The jackpot system 600 may also report jackpot win events to an nconnect server 620, via nconnect adapter 630, which allows the nconnect server 620 to award loyalty points to the winning player of jackpot awards. In some embodiments, jackpot win events may also be transmitted as web events 650 out to external devices or systems. For example, some jackpot win events may be transmitted as web events 650 for jackpot award presentations on signage at the winning casino or near the winning device.

Figure 7:
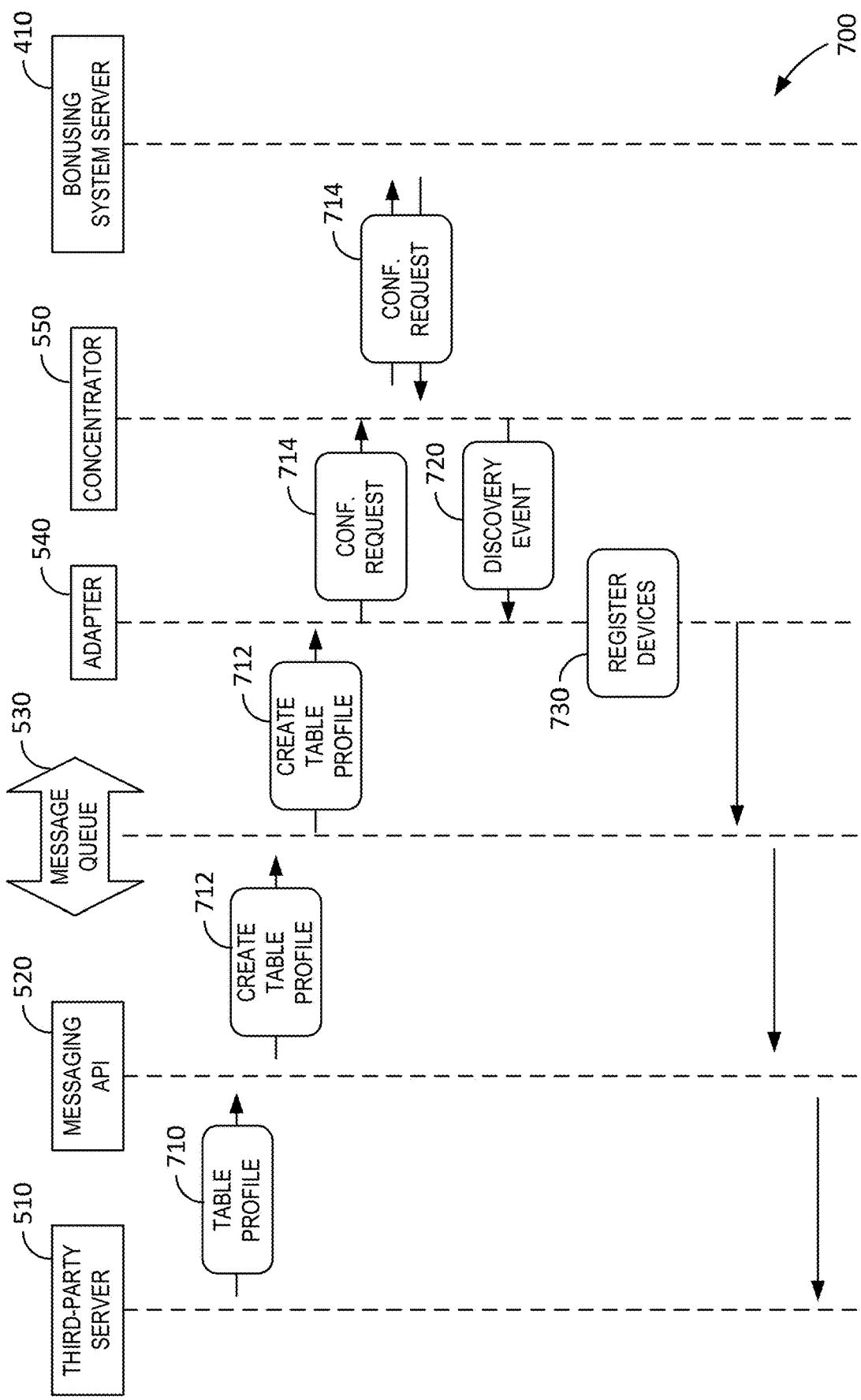
FIG. 7 illustrates an example data flow for a device configuration process of a table game that may be performed by the jackpot systems shown in FIGS. 4-6.

FIG. 7 illustrates an example data flow for a device configuration process 700 of a table game 420 that may be performed by the jackpot systems 400, 500, 600 shown in FIGS. 4-6. In the example embodiment, the third-party server 510 transmits a table profile message 710 to the messaging API 520. The table profile message 510 may include, for example, table ID data (e.g., a unique table ID, one or more unique position IDs for each position at the table 420), a table definition defining the layout of the table 420, and game profile data (e.g., what game is provided by or played at the table 420, wager minimums or limits, or the like). The messaging API 520 transmits a create table profile message 512 onto the message queue 530. Upon receipt, the adapter 540 converts the create table profile message 712 into a configuration request message 714 and sends to the concentrator(s) 550. The configuration request 714 may be for the table 420 or the table 420 and each individual position at the table 420. The concentrator 550 sends the configuration request(s) 714 to the bonusing system server 410, which creates and registers the table 420 and uniquely identifiable positions for each position at the table 420. In some embodiments, the concentrator 550 may initiate a discovery event 720 and the adapter 540 may register devices before responding back through the message queue 530 and out to the third party server 510 (e.g., as a synchronous call and response).

Figure 8:
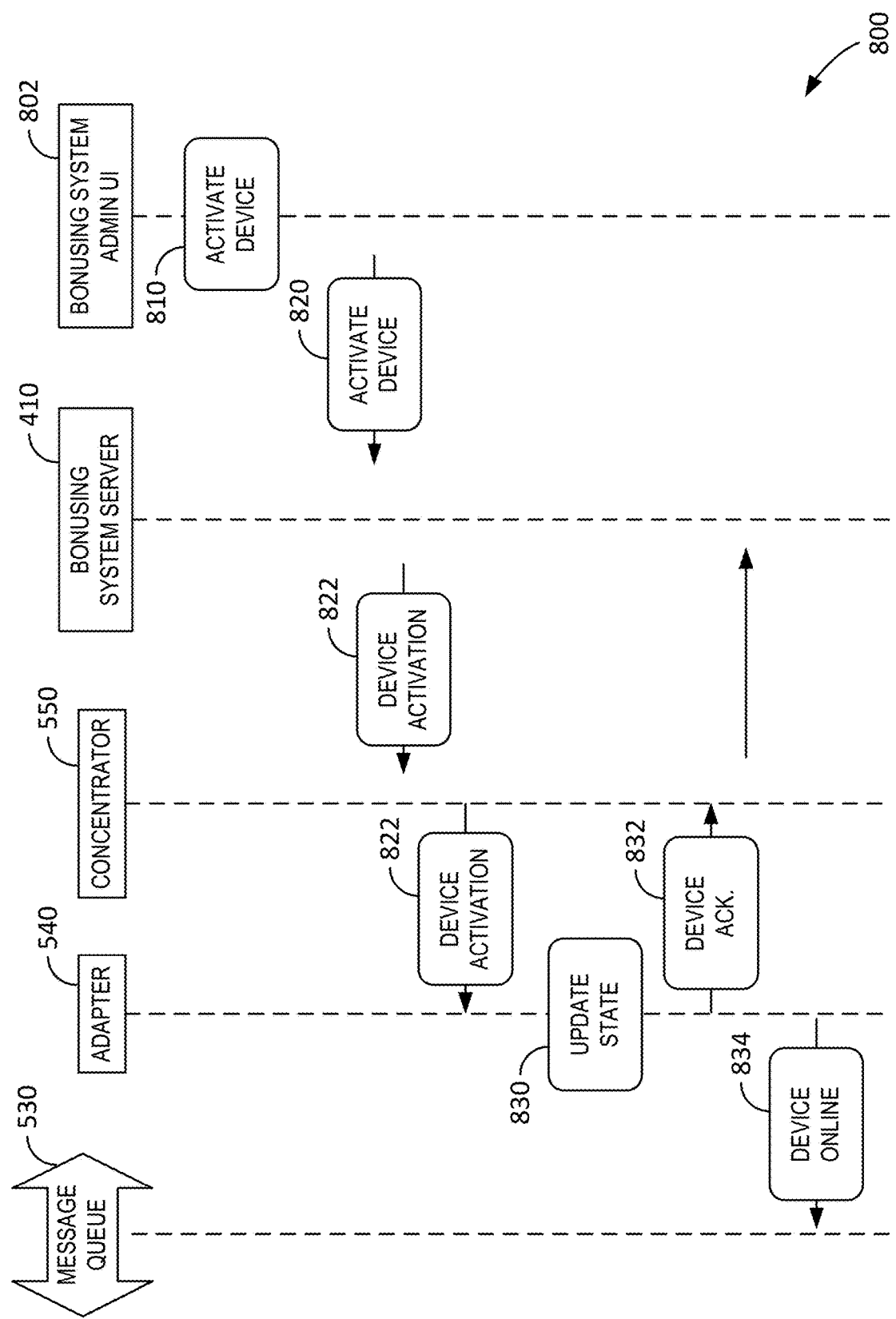
FIG. 8 illustrates an example data flow for a device activation process that may be performed by the jackpot systems shown in FIGS. 4-6.

FIG. 8 illustrates an example data flow for a device activation process 800 that may be performed by the jackpot systems 400, 500, 600 shown in FIGS. 4-6. The device activation process 800 may be performed for any of the devices 104, 420, 256, either as direct managed devices 552 or third-party managed devices 514 (shown in FIG. 5). In the example embodiment, before a device is allowed to participate in the jackpots provided by the bonusing system, an administrator activates the device 810 within the system using a bonusing system administrator user interface (UI) 802. Upon device activation 820 in the UI, bonusing system server 410 transmits a device activation message 822 to the concentrator(s) 550. The device activation message 822 identifies which device is being activated (e.g., by a unique device ID of the device or position at the device) and may identify particular jackpots for which that device is configured to participate (e.g., using unique jackpot IDs managed by the system). The concentrator 550 transmits the device activation message 822 to the adapter 540 which, accordingly updates the state of the device at operation 830, sends a device activation acknowledgement message 832 back to the concentrator 550 and sends a device online event message 834 to the message queue 530. This device activation process 800, in some cases, may trigger the system to begin tracking gaming sessions at the device, accepting jackpot contributions from the activated device, including the activated device in jackpot win determinations, and otherwise allowing the activated device to participate in the bonusing systems as described herein.

In the example embodiment, the system also monitors state of activated devices. For example, the system may transmit heartbeat messages from devices 104, 420, 256 periodically (e.g., every 15 seconds) to allow the system to determine current health of the device. If the system continues to receive heartbeats from an activated device, the system continues to maintain that device as activated. If the system loses heartbeat from the activated device, the system may deactivate the device, thus removing that device from participation in the system and associated jackpots.

Figure 9:
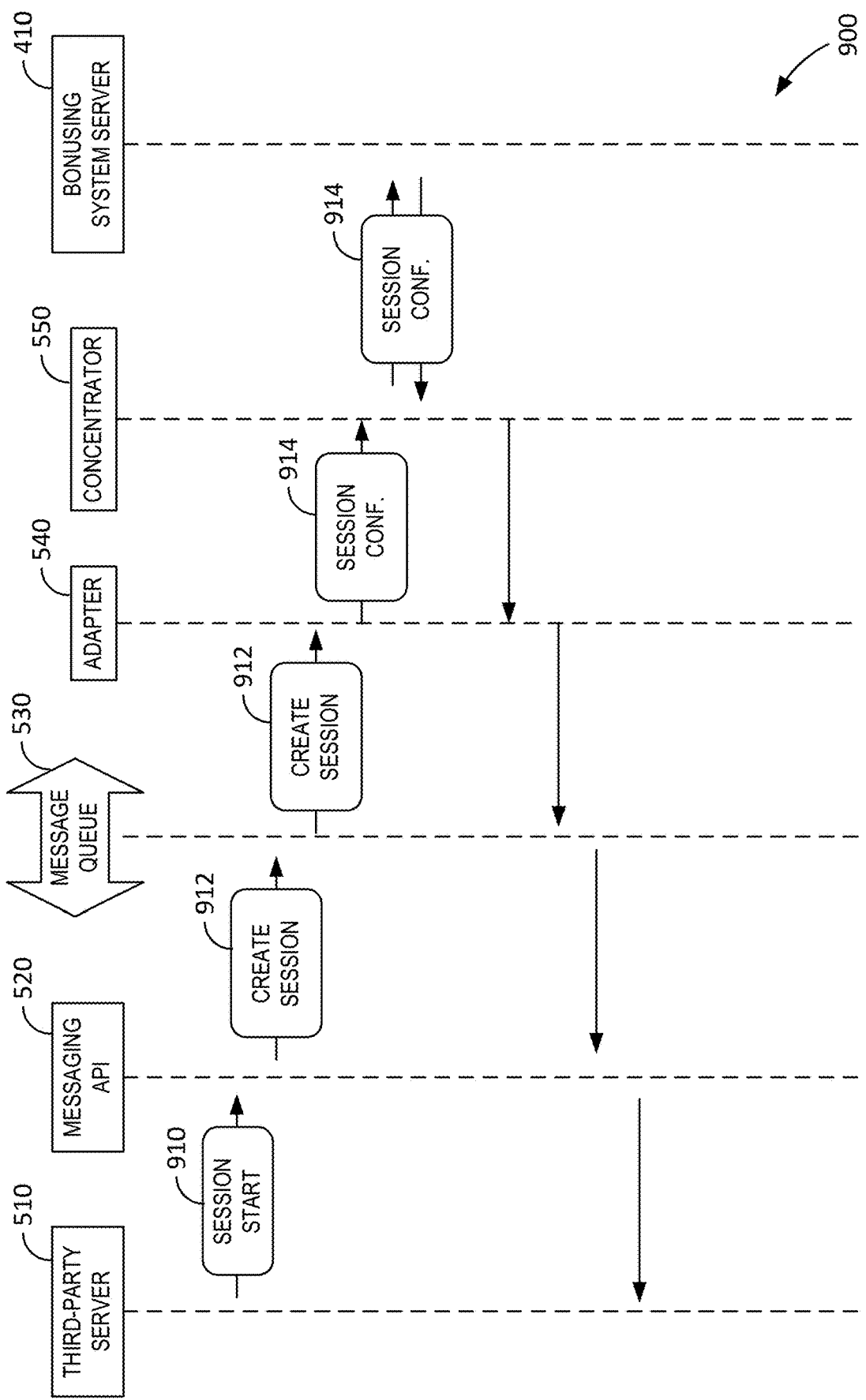
FIG. 9 illustrates an example data flow for a player session creation process that may be performed by the jackpot systems shown in FIGS. 4-6.

FIG. 9 illustrates an example data flow for a player session creation process 900 that may be performed by the jackpot systems 400, 500, 600 shown in FIGS. 4-6. In the example embodiment, the player session creation process 900 is performed for third-party managed devices 514 (shown in FIG. 5) when a player begins a gaming session at one of the devices 514 (e.g., as a session start event). The third-party server 510 transmits a session start event message 910 to the messaging API 520. The session start event message 910 may include, for example, device identification information (e.g., a device ID of the device 514 at which the player is playing), player identification information (e.g., a player loyalty ID, login ID, or the like), timestamp information, and game information (e.g., what game is being played in the gaming session). A create session message 912 is sent from the messaging API 520 through the message queue 530 to the adapter 540. The adapter 540 transmits a session configuration message 914 through to the concentrator 550 and bonusing system server 410, thereby completing a registration of this new gaming session with the bonusing system server 410. The bonusing system server 410 may transmit, in response, session configuration information about the session back to the third-party server, such as a session start confirmation, jackpot participation information (e.g., what bonuses or jackpot(s) the session is eligible for), and contribution information (e.g., a contribution amount or percentage for each play, or such).

In some embodiments, while not separately depicted, the system may perform a similar data flow for session termination events initiated by the gaming device. For example, when the player 402, gaming device 514, or third-party server 510 identifies the termination of an active gaming session (e.g., via the player carding out, logging out, or disconnecting from the gaming device), the third-party server 510 may similarly send a session termination message through a similar flow to the bonusing system server 410, thereby terminating the gaming session and associated participations.

Figure 10:
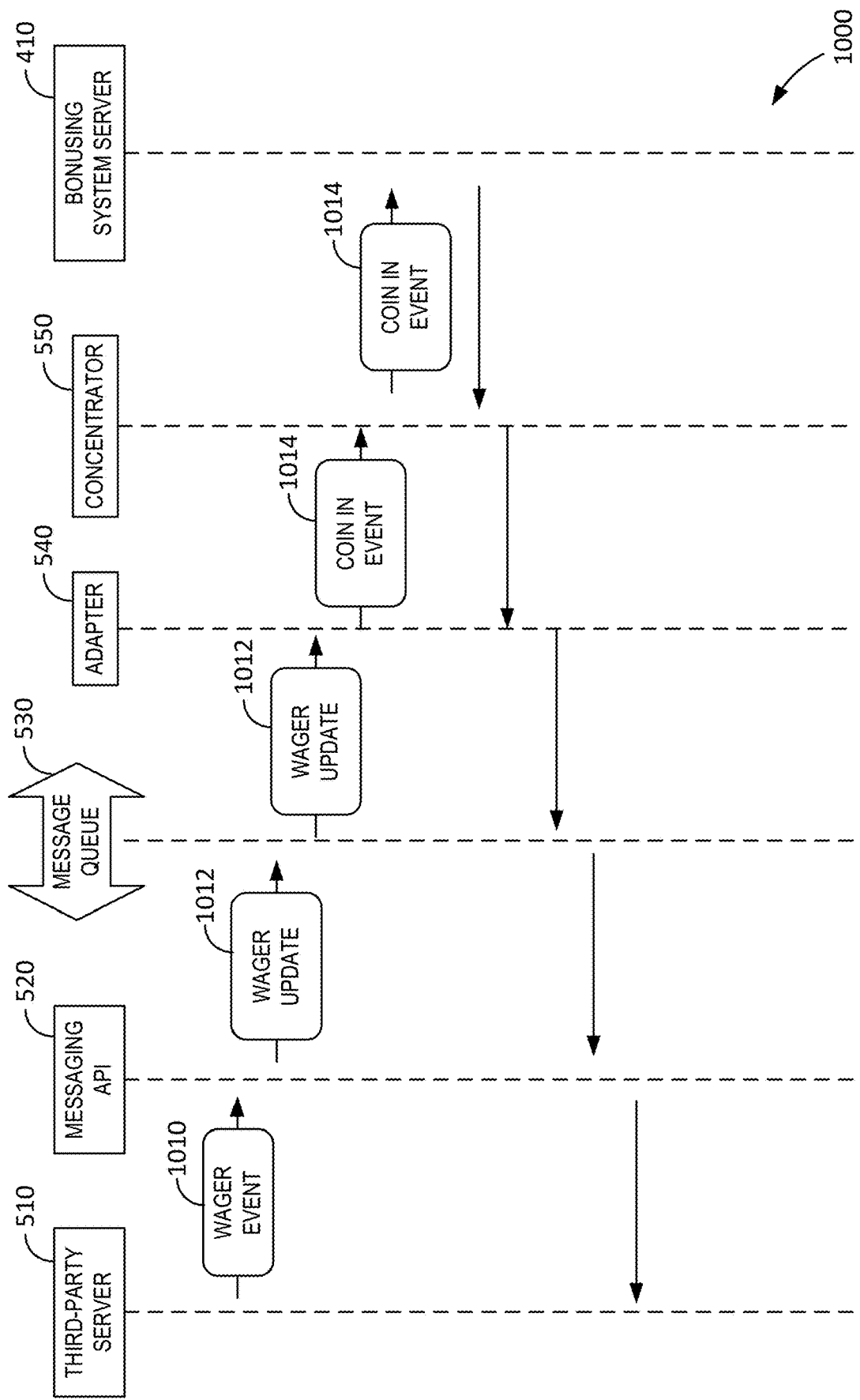
FIG. 10 illustrates an example data flow for a wager event process that may be performed by the jackpot systems shown in FIGS. 4-6.

FIG. 10 illustrates an example data flow for a wager event process 1000 that may be performed by the jackpot systems 400, 500, 600 shown in FIGS. 4-6. In the example embodiment, the wager event process 1000 is performed when a player begins a gaming session at one of the devices 514 (e.g., at the time a wager is placed). The third-party server 510 transmits a wager event message 1010 to the messaging API 520. The wager event message 1010 may include, for example, device identification information (e.g., a device ID of the device 514 at which the player is playing), player identification information (e.g., a player loyalty ID, login ID, or the like), timestamp information, game information (e.g., what game is being played in the gaming session), and game play information (e.g., wager value as "coin in," game outcome). A wager update message 1012 is sent from the messaging API 520 through the message queue 530 to the adapter 540. The adapter 540 transmits a coin in event message 1014 through to the concentrator 550 and bonusing system server 410, thereby indicating that this gaming session and associated device have submitted a wager that may be eligible for a potential jackpot.

Figure 11:
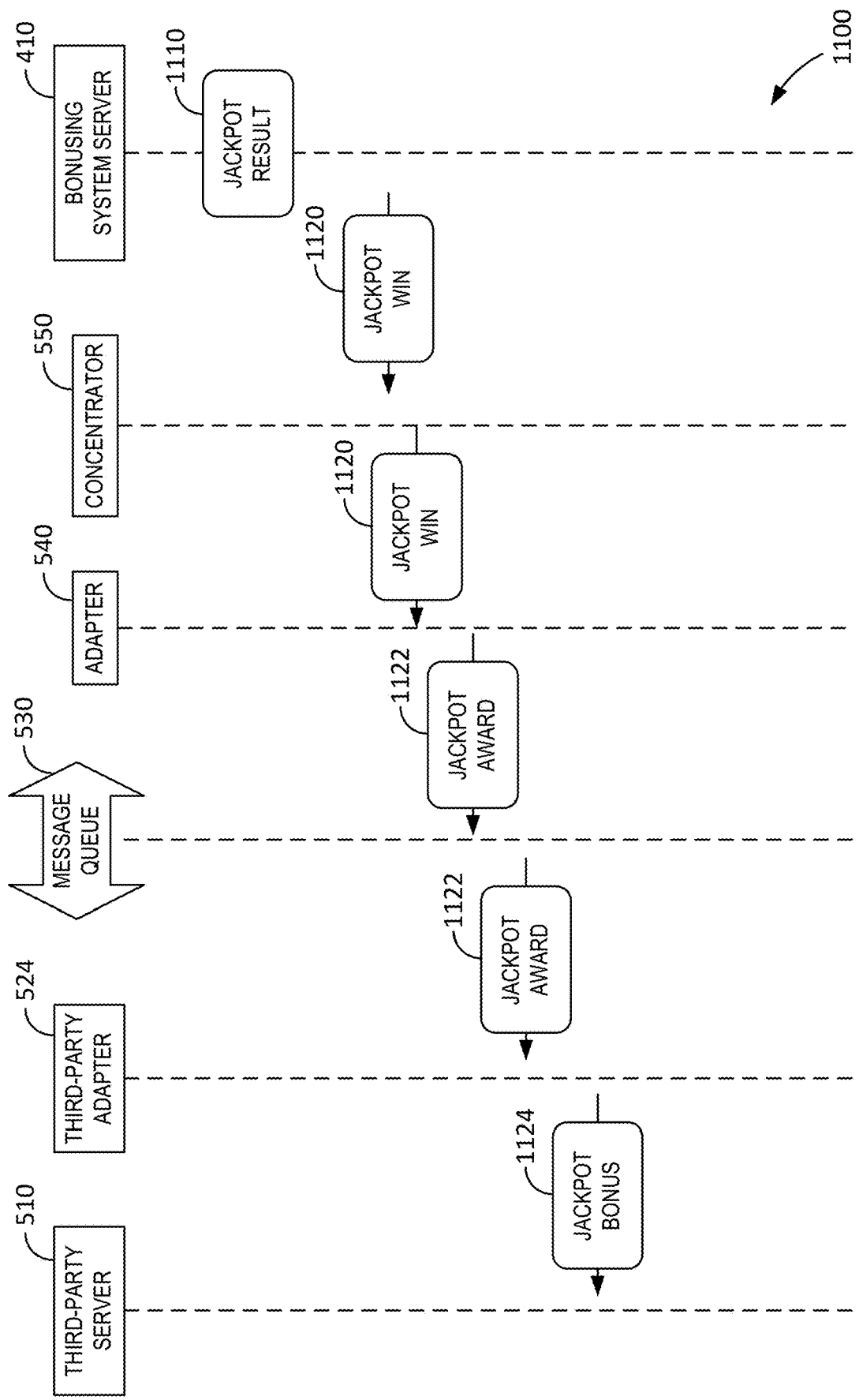
FIG. 11 illustrates a data flow for an example jackpot award process that may be performed by the jackpot systems shown in FIGS. 4-6.

FIG. 11 illustrates a data flow for an example jackpot award process 1100 that may be performed by the jackpot systems 400, 500, 600 shown in FIGS. 4-6. In the example embodiment, the jackpot award process 1100 is performed when a wager event 1010 (e.g., as shown in FIG. 10) results in a bonus award (e.g., the game play resulting in a jackpot win). At operation 1110, the bonusing system server 410 performs a bonus award determination for the wager event 1010 (e.g,. via analysis of game output data, via RNG output and weighted table, or any of the other jackpot determination methods described herein). If the wager event 1010 results in a jackpot win, the bonusing system server 410 transmits a jackpot win message 1120 to the concentrator 550 and through to the adapter 540. The jackpot win message 1120 may include session information (e.g., session ID, player ID, device ID, wager event ID associated with the gaming session or wager event 1010), bonus information (e.g., an award or an amount won by the player, a type of jackpot or bonus achieved), and payout information (e.g., how the award is provided to the player). The adapter 540 transmits a jackpot award message 1122 through the message queue 530 and to the third-party adapter 524, which transmits a jackpot bonus message to the third-party server 510 (e.g., via its API 512). In some embodiments, processing of the jackpot result 1110 may also include the bonusing system server 410 performing backend transactions to facilitate the payout of the award. For example, the bonusing system server 410 may perform a transaction to a player account or a digital wallet account of the winning player. In some embodiments, the jackpot award process 1100 may include awarding the winning device for the jackpot won (e.g., via an increment of a credit meter on an EGM 104 or credit total on mobile gaming device 256, a payout instruction to a dealer at a table 420, or the like).

In some embodiments, the system may perform a jackpot award confirmation process (not separately depicted) to confirm that the jackpot award has been completed. For example, upon receipt of the jackpot bonus message 1124, the third-party server 510 may perform an awarding of the jackpot to the winning device 514. Upon confirmation that the jackpot has been successfully awarded to the player or device, the third-party server 510 may transmit a jackpot award confirmation message back through the messaging API 520 to the bonusing system server 410, thereby confirming success or failure of the payout.

Figure 12:
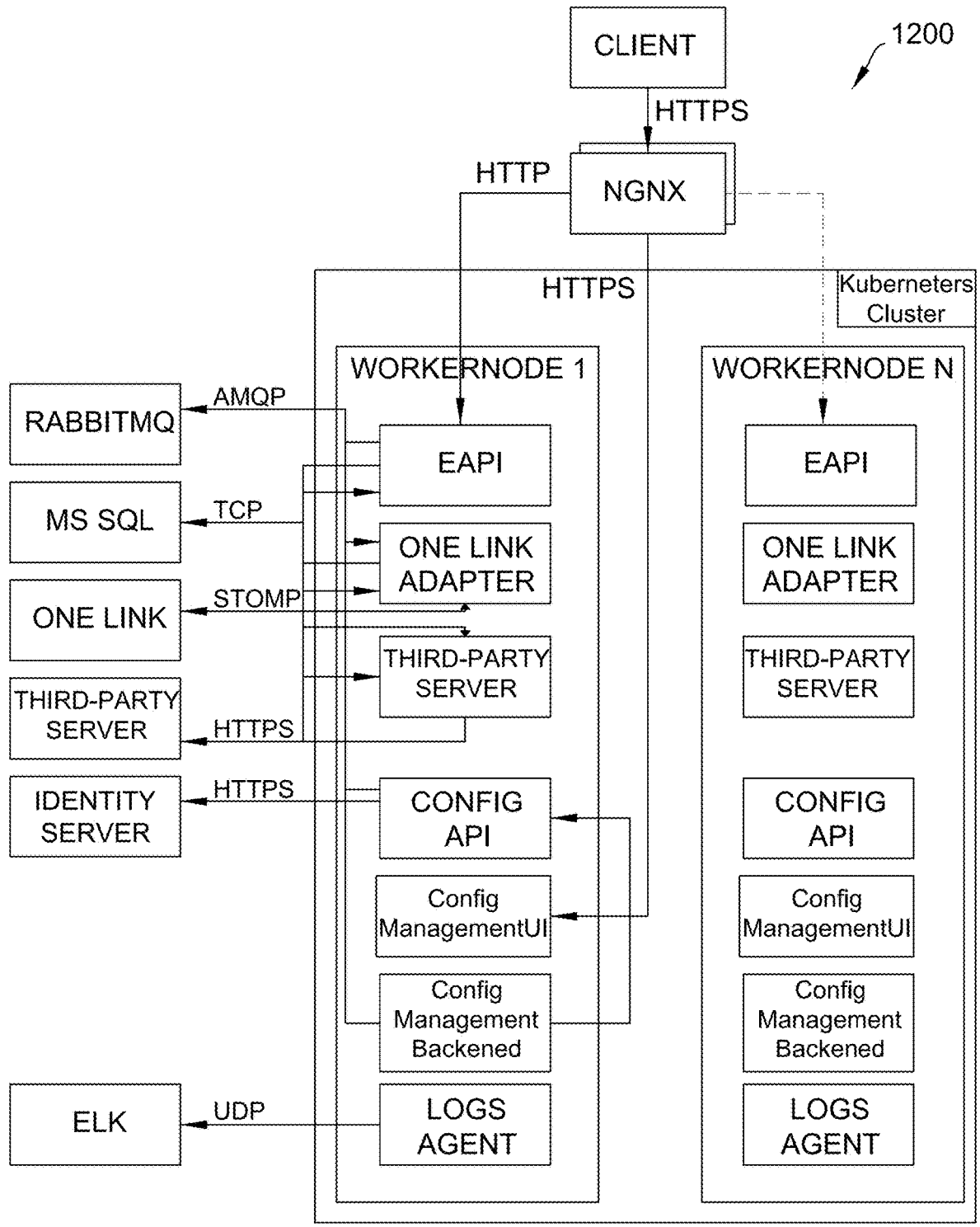
FIG. 12 is an example processing architecture that may be used with the jackpot systems shown in FIGS. 4-6.

FIG. 12 is an example processing architecture that may be used with the jackpot systems 400, 500, 600 shown in FIGS. 4-6. In the example embodiment, components of the jackpot system are deployed on various worker nodes of a processing cluster (e.g., a Kubernetes cluster). Each worker node executes the messaging API 520 (e.g., "EAPI"), the adapter 540 (e.g., "OneLink Adapter"), and the third-party adapter. Each worker node may be, for example, a physically or logically partitioned or provisioned server or virtual machine in the cluster. The worker nodes communicate with the message queue (e.g., "RabbitMq"), one or more databases (e.g., "My SQL," the bonusing database 412, or the like), the bonus system server 410 (e.g., "OneLink"), one or more third-party server(s) 510, and the identity server 522 (e.g., "IdentityServer"). Client devices (e.g., third-party servers 510 may connect into the messaging APIs 520 of the worker nodes.

The term "computer-readable medium" refers to any non-transitory storage or memory that may store computer-executable instructions or other data in a computer system and be read by a processor in the computer system. A computer-readable medium may take many forms, including but not limited to non-volatile storage or memory (such as optical or magnetic disk media, a solid-state drive, a flash drive, PROM, EPROM, and other persistent memory) and volatile memory (such as DRAM). The term "computer-readable media" excludes signals, waves, and wave forms or other intangible or transitory media that may nevertheless be readable by a computer.

While the present disclosure has been described with respect to the figures, it will be appreciated that many modifications and changes may be made by those skilled in the art without departing from the spirit of the inventions. Any variation and derivation from the above description and figures are included in the scope of the present disclosure as defined by the claims.

What is claimed is:

1. A bonusing system for gaming devices, the bonusing system comprising:
a memory storing bonus configuration information defining a first bonus award eligible to be won via participating gaming devices;
a messaging application programming interface (API) configured to receive device registration event messages from third-party computer devices;
at least one bonusing computer device configured to manage award determination for the first bonus award based on game sessions at a first gaming table and a plurality of other electronic gaming device types; and
at least one processor storing instructions that, when executed, cause the at least one processor to:
establish the first bonus award as available to participating gaming devices based on a bonus award configuration;
receive, by the messaging API from at least one third-party computer device that manages a plurality of gaming table devices, a first device registration event message for a first gaming table device of the plurality of gaming table devices, the first device registration event message comprising a unique identifier for the first gaming table device;
transmit the first device registration event message to the at least one bonusing computer device;
register, by the at least one bonusing computer device, a first gaming table to participate in the first bonus award by electronically receiving the first device registration event message;
register, by the at least one bonusing computer device, a plurality of electronic gaming machines (EGMs) to participate in the first bonus award by electronically receiving a unique device identifier for each of the plurality of EGMs;
receive, by the at least one bonusing computer device from a first electronic gaming machine (EGM) of the plurality of registered EGMs, a first wager event message indicating a first wager being performed by a first player at the first EGM;
receive, by the messaging API from the first table gaming device, a second wager event message indicating a second wager being performed by a second player at a first position of a plurality of positions of the first table gaming device, wherein the second wager event message is received after a second wager event is detected by the first table gaming device based on input from at least one radio frequency identification (RFID) sensor detecting at least one RFID-enabled chip in a wager area on a table surface of the first gaming table;

transmit the second wager event message to the at least one bonusing computer device;

determine, by the at least one bonusing computer device, that one of the first and second wager events results in an award of the first bonus award based on output of a random number generator (RNG), the award of the first bonus award identifying one or more of a winning player and a winning gaming device; and award the first bonus award to the winning player at the winning gaming device based on the determination.

2. The bonusing system of claim 1, wherein receiving the first wager event message further includes receiving the first wager event message after a first wager event is detected by the first EGM based on a press of a wagering button on the first EGM by the first player.

3. The bonusing system of claim 1, wherein the instructions further cause the at least one processor to:

register a plurality of mobile gaming devices to participate in the first bonus award by electronically receiving a unique device identifier for each of the participating mobile gaming devices; and receive, from a first mobile gaming device of the plurality of registered mobile devices, a third wager event message indicating a third wager being performed by a third player at the first mobile gaming device, wherein the determining further includes determining that one of the first, second, and third wagering events results in an award of the first bonus award based on output of a random number generator (RNG).

4. The bonusing system of claim 1, wherein the instructions further cause the at least one processor to:

receive, from one or more of the first EGM and the first table gaming device, a session start event message indicating the beginning of a gaming session at an active gaming device; and configure the active gaming device to participate in the first bonus award, making the gaming session eligible to potentially win the first bonus award during the determining.

5. The bonusing system of claim 1, wherein the first bonus award is a progressive jackpot, wherein the instructions further cause the at least one processor to:

determine a first progressive jackpot contribution amount for the first wager event based on a wager amount provided by the first EGM in the first wager event message;

determine a second progressive jackpot contribution amount for the second wager event based on a wager amount provided by the first table gaming device, the wager amount being automatically detected at the first table gaming device based on detection of one or more RFID-enabled chips in the wager area on the table surface of the first table gaming device; and increment a progressive jackpot total by the first and second progressive jackpot contribution amounts.

6. The bonusing system of claim 1, wherein the first bonus award is configured as a temporal award that is pre-configured to be awarded at one or more of a predetermined award time and during a predetermined award window of time.

7. The bonusing system of claim 6, wherein the instructions further cause the at least one processor to:

identify a pool of eligible participants that are eligible to participate in the first bonus award when determining to award the first bonus award, wherein the first EGM and the first table gaming device are included in the pool of eligible participants, wherein the determining further comprises selecting a winning participant from the pool of eligible participants based on the output of the RNG.

8. The bonusing system of claim 7, wherein identifying the pool of eligible participants includes identifying eligibility of gaming sessions at participating devices based on at least a currently active gaming session at the participating devices and one or more of loyalty level of an active player at the participating device, a most recent wager amount provided during the currently active gaming session at the participating device, and recent wager history during the currently active gaming session at the participating device.

9. A method of providing bonusing for gaming devices, the method comprising:

establishing a first bonus award as available to participating gaming devices based on a bonus award configuration;

receiving, by a messaging API from at least one third-party computer device that manages a plurality of gaming table devices, a first device registration event message for a first gaming table device of the plurality of gaming table devices, the first device registration event message comprising a unique identifier for the first gaming table device;

transmitting the first device registration event message to at least one bonusing computer device;

registering, by the at least one bonusing computer device, a first gaming table to participate in the first bonus award by electronically receiving the first device registration event message;

registering, by the at least one bonusing computer device, a plurality of electronic gaming machines (EGMs) to participate in the first bonus award by electronically receiving a device identifier for each of the plurality of EGMs;

receiving, by the at least one bonusing computer device from a first electronic gaming machine (EGM) of the plurality of registered EGMs, a first wager event message indicating a first wager being performed by a first player at the first EGM;

receiving, by the messaging API from the first table gaming device of the plurality of registered table gaming devices, a second wager event message indicating a second wager being performed by a second player at a first position of a plurality of positions of the first table gaming device, wherein the second wager event message is received after a second wager event is detected by the first table gaming device based on input from at least one radio frequency identification (RFID) sensor detecting at least one RFID-enabled chip in a wager area on a table surface of the first gaming table;

transmitting the second wager event message to the at least one bonusing computer device;

establishing eligibility of the first EGM and the first table gaming device to participate in the first bonus award based on detection of an active gaming session at the associated devices;

determining, by the at least one bonusing computer device, that one of the first and second wager events results in an award of the first bonus award based on output of a random number generator (RNG), the award of the first bonus award identifying one or more of a winning player and a winning gaming device; and awarding the first bonus award to the winning player at the winning gaming device based on the determination.

10. The method of claim 9, wherein receiving the first wager event message further includes receiving the first wager event message after a first wager event is detected by the first EGM based on a press of a wagering button on the first EGM by the first player.

11. The method of claim 9 further comprising:
registering a plurality of mobile gaming devices to participate in the first bonus award by electronically receiving a device identifier for each of the participating mobile gaming devices; and
receiving, from a first mobile gaming device of the plurality of registered mobile devices, a third wager event message indicating a third wager being performed by a third player at the first mobile gaming device,
wherein the determining further includes determining that one of the first, second, and third wagering events results in an award of the first bonus award based on output of a random number generator (RNG).

12. The method of claim 9 further comprising:
receiving, from one or more of the first EGM and the first table gaming device, a session start event message indicating the beginning of a gaming session at an active gaming device; and
configuring the active gaming device to participate in the first bonus award, making the gaming session eligible to potentially win the first bonus award during the determining.

13. The method of claim 9, wherein the first bonus award is a progressive jackpot, the method further comprising:
determining a first progressive jackpot contribution amount for the first wager event based on a wager amount provided by the first EGM in the first wager event message;
determining a second progressive jackpot contribution amount for the second wager event based on a wager amount provided by the first table gaming device, the wager amount being automatically detected at the first table gaming device based on detection of one or more RFID-enabled chips in the wager area one the table surface of the first table gaming device; and
incrementing a progressive jackpot total by the first and second progressive jackpot contribution amounts.

14. The method of claim 9, wherein the first bonus award is configured as a temporal award that is pre-configured to be awarded at one or more of a predetermined award time and during a predetermined award window of time.

15. The method of claim 14 further comprising:
identifying a pool of eligible participants that are eligible to participate in the first bonus award when determining to award the first bonus award, wherein the first EGM and the first table gaming device are included in the pool of eligible participants,
wherein the determining further comprises selecting a winning participant from the pool of eligible participants based on the output of the RNG.

16. The method of claim 15, wherein identifying the pool of eligible participants includes identifying eligibility of gaming sessions at participating devices based on at least a currently active gaming session at the participating devices and one or more of loyalty level of an active player at the participating device, a most recent wager amount provided during the currently active gaming session at the participating device, and recent wager history during the currently active gaming session at the participating device.

17. A non-transitory computer-readable medium storing instructions that, when executed by at least one processor, causes the at least one processor to:

establish a first bonus award as available to participating gaming devices based on a bonus award configuration;
receive, by a messaging API from at least one third-party computer device that manages a plurality of gaming table devices, a first device registration event message for a first gaming table device of the plurality of gaming table devices, the first device registration event message comprising a unique identifier for the first gaming table device;
transmit the first device registration event message to at least one bonusing computer device;
register, by the at least one bonusing computer device, a first gaming table to participate in the first bonus award by electronically receiving the first device registration event message;
register, by the at least one bonusing computer device, a plurality of electronic gaming machines (EGMs) to participate in the first bonus award by electronically receiving a separate device identifier for each of the plurality of EGMs;
receive, by the at least one bonusing computer device from a first electronic gaming machine (EGM) of the plurality of registered EGMs, a first wager event message indicating a first wager being performed by a first player at the first EGM;
receive, by the messaging API from the first table gaming device, a second wager event message indicating a second wager being performed by a second player at a first position of a plurality of positions of the first table gaming device, wherein the second wager event message is received after a second wager event is detected by the first table gaming device based on input from at least one radio frequency identification (RFID) sensor detecting at least one RFID-enabled chip in a wager area on a table surface of the first gaming table;
transmit the second wager event message to the at least one bonusing computer device;
configure the first EGM and the first table gaming device as eligible to participate in the first bonus award based on detection of an active gaming session at the associated devices;
determine, by the at least one bonusing computer device, that one of the first and second wager events results in an award of the first bonus award based on output of a random number generator (RNG), the award of the first bonus award identifying one or more of a winning player and a winning gaming device; and
award the first bonus award to the winning player at the winning gaming device based on the determination.

18. The non-transitory computer-readable medium of claim 17, wherein the first bonus award is configured as a temporal award that is pre-configured to be awarded at one or more of a predetermined award time and during a predetermined award window of time.

19. The non-transitory computer-readable medium of claim 18, wherein the instructions are further configured to cause the at least one processor to:
identify a pool of eligible participants that are eligible to participate in the first bonus award when determining to award the first bonus award, wherein the first EGM and the first table gaming device are included in the pool of eligible participants,
wherein the determining further comprises selecting a winning participant from the pool of eligible participants based on the output of the RNG.

20. The non-transitory computer-readable medium of claim 19, wherein identifying the pool of eligible participants includes identifying eligibility of gaming sessions at participating devices based on at least a currently active gaming session at the participating devices and one or more of loyalty level of an active player at the participating device, a most recent wager amount provided during the currently active gaming session at the participating device, and recent wager history during the currently active gaming session at the participating device.

\* \* \* \* \*